United States Patent
Pandhi et al.

(10) Patent No.: US 12,462,271 B2
(45) Date of Patent: Nov. 4, 2025

(54) INTELLIGENT TENDER OPTIONS

(71) Applicant: Block, Inc., Oakland, CA (US)

(72) Inventors: Rohini Pandhi, San Francisco, CA (US); Sudheer Anne, San Francisco, CA (US); Paul Silvis, San Francisco, CA (US)

(73) Assignee: Block, Inc., Oakland, CA (US)

( * ) Notice: Subject to any disclaimer, the term of this patent is extended or adjusted under 35 U.S.C. 154(b) by 217 days.

(21) Appl. No.: 18/320,175

(22) Filed: May 18, 2023

(65) Prior Publication Data

US 2023/0289843 A1    Sep. 14, 2023

Related U.S. Application Data

(63) Continuation of application No. 17/732,074, filed on Apr. 28, 2022, now abandoned, which is a continuation of application No. 16/698,010, filed on Nov. 27, 2019, now Pat. No. 11,321,726.

(51) Int. Cl.
   *G06Q 30/0207* (2023.01)
   *G06Q 10/1093* (2023.01)
   *G06Q 20/10* (2012.01)

(52) U.S. Cl.
   CPC ..... *G06Q 30/0215* (2013.01); *G06Q 10/1095* (2013.01); *G06Q 20/102* (2013.01)

(58) Field of Classification Search
   CPC .......... G06Q 30/0215; G06Q 10/1095; G06Q 20/102; G06Q 20/202
   USPC ....................................................... 705/7.19
   See application file for complete search history.

(56) References Cited

U.S. PATENT DOCUMENTS

| | | | |
|---|---|---|---|
| 10,410,194 B1* | 9/2019 | Grassadonia | G06Q 20/327 |
| 11,321,726 B1 | 5/2022 | Pandhi et al. | |
| 2007/0016508 A1 | 1/2007 | Sun | |
| 2012/0205445 A1 | 8/2012 | Rothschild | |
| 2013/0197980 A1 | 8/2013 | Lerner et al. | |
| 2013/0246272 A1 | 9/2013 | Kirsch | |
| 2013/0246280 A1 | 9/2013 | Kirsch | |

(Continued)

FOREIGN PATENT DOCUMENTS

WO    2011/112752 A1    9/2011

OTHER PUBLICATIONS

Kreyon, Tender Management System, 2017 (Year: 2017).*

(Continued)

*Primary Examiner* — Tarek Elchanti
(74) *Attorney, Agent, or Firm* — Lee & Hayes, P.C.

(57) ABSTRACT

Intelligent tender options for payment are described. In an example, buyer and seller profiles can be stored in a datastore associated with a service provider. The profiles can include interaction data including historical transaction data. A machine learning model can be trained using at least a portion of the historical transaction data. Responsive to receiving transaction data for a current transaction, a personalized plurality of tender options is determined based at least in part on (i) the machine learning model, (ii) one or more of a buyer profile, a seller profile, or the transaction data, and (iii) one or more services of the service provider available to the buyer based at least in part on the buyer profile. A GUI is presented on a seller or buyer device including a plurality of actuation mechanisms associated with respective tender options.

20 Claims, 14 Drawing Sheets

(56) References Cited

U.S. PATENT DOCUMENTS

| | | |
|---|---|---|
| 2014/0012747 A1 | 1/2014 | Nyman |
| 2014/0195326 A1 | 7/2014 | Men et al. |
| 2014/0330644 A1 | 11/2014 | Burrell |
| 2014/0379584 A1 | 12/2014 | Ward |
| 2017/0032337 A1 | 2/2017 | Berger |
| 2018/0012268 A1* | 1/2018 | Simantov ............... G06N 20/00 |
| 2019/0220838 A1* | 7/2019 | Olenoski .............. G06Q 20/405 |
| 2020/0204541 A1* | 6/2020 | Nair .................... H04L 63/0853 |
| 2022/0358530 A1 | 11/2022 | Pandhi et al. |

OTHER PUBLICATIONS

Rachel Blakely-Gray, "Speed up Customer Payments With an Early Payment Discount", Patriot, Sep. 1, 2022, 26 pages.
Rachel Blakely-Gray, "Speed up Customer Payments With an Early Payment Discount", pp. 1-4 (Aug. 2, 2018).

* cited by examiner

INTELLIGENT TENDER OPTIONS

PRIORITY

This application is a continuation of, and claims priority to, U.S. patent application Ser. No. 17/732,074, filed Apr. 28, 2022, which is a continuation of U.S. patent application Ser. No. 16/698,010, filed Nov. 27, 2019, and issued as U.S. Pat. No. 11,321,726, on May 3, 2022, the contents of each are fully incorporated by reference herein.

TECHNICAL FIELD

An invoice is a document issued by a seller to a buyer that indicates quantities and costs of goods and/or services provided by the seller to the buyer. In some examples, an invoice creates an obligation on behalf of the buyer to pay the seller, creating an account receivable. Invoices are important to the functioning of a business because invoices record sales transactions. Invoices can be a challenge for businesses, however, because generating invoices is time consuming and buyers do not always pay in a timely fashion. Therefore, business owners invest resources generating invoices and/or following-up with buyers for payment. Furthermore, in conventional technologies, buyers pay invoices via cash, check, or credit card—the processing time for some which can be days, thereby denying sellers funds while they wait. If buyers do not tender payment for such invoices, sellers can be out funds that they need for operating their businesses.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
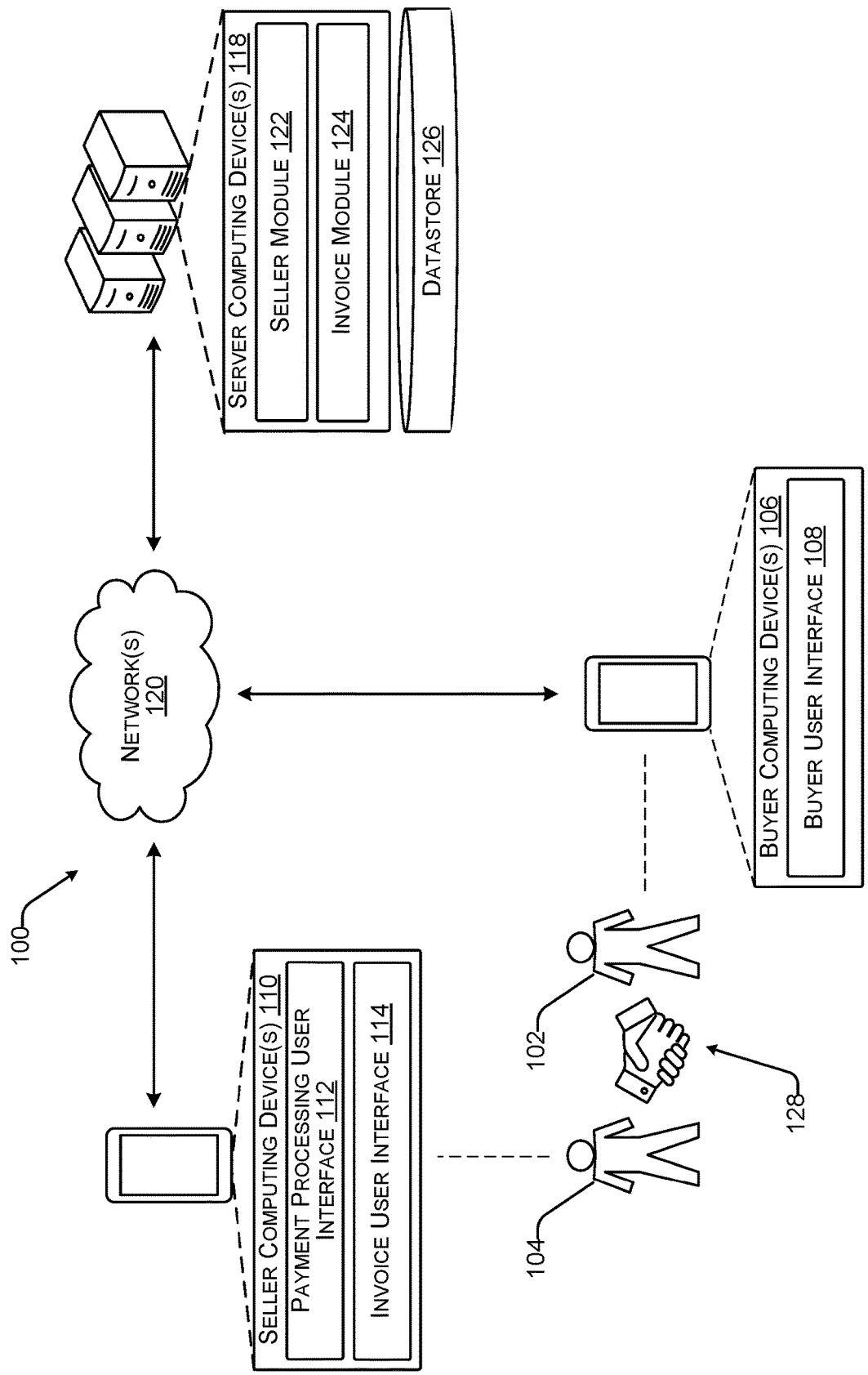
FIG. 1 illustrates an example environment for intelligent invoice generation and/or management using techniques described herein.

Techniques described herein are directed to intelligently generating and/or managing invoices. In an example, a service provider can underwrite a buyer at a point-of-sale so that the service provider can determine whether the buyer can opt to tender payment for a cost of an entire purchase from a seller or individual items associated with the purchase via an invoice. In some examples, such underwriting can be based on information associated with the buyer. In additional or alternative examples, such underwriting can be based on information associated with the seller and/or the item(s) associated with the purchase. Furthermore, in some examples, the service provider can intelligently determine personalized or customized options for enabling the buyer to tender payment for the cost of the entire purchase or individual items associated with the purchase, for example, using other services provided by the service provider (e.g., an account generated from funds received via a peer-to-peer payment service availed by the service provider, a loan offered by the service provider, etc.). As such, techniques described herein enable personalized and/or customized options for tendering payment for purchases at the point-of-sale and/or via invoices (e.g., at a time after the purchase at the point-of-sale).

In at least one example, techniques described herein can facilitate the management of invoices, for example, by enabling sellers to generate invoices and/or track payment (or lack thereof) of invoices. In some examples, the service provider can offer a seller the ability to incentivize payment for an outstanding invoice based on changed circumstances of the seller (e.g., reduced cash flow, unforeseen bill payment, etc.) and/or information associated with the outstanding invoice. In some examples, such an incentive can modify terms of the invoice (e.g., reduce the total cost) and/or offer a discount for a future transaction (e.g., with the seller or another seller associated with the service provider). Furthermore, in some examples, the service provider can offer a seller the ability to incentivize on-time or early payment using incentives as described above.

Techniques described herein leverage information associated with buyers, sellers, and/or transactions, which can be availed based on data stored and/or otherwise available to a service provider for making intelligent determinations. In at least one example, the service provider can offer payment processing services whereby the service provider processes transactions for sellers associated with the service provider. In at least one example, the service provider can receive transaction data (e.g., payment information, user authentication data, purchase amount information, point-of-purchase information (e.g., item(s) purchased, date of purchase, time of purchase, parties to the transaction, etc.), etc.) associated with transactions between buyers and sellers, and can transmit requests (e.g., authorization, capture, settlement, etc.) to payment service server computing device(s) to process payment for transactions between buyers and sellers. The service provider can receive indications of successes or failures of the transactions (e.g., from the payment service server computing device(s)) and can notify sellers of such success or failures. That is, the service provider can be an intermediary between sellers and payment servicers. In some examples, funds generated from such transactions can be maintained in accounts of the sellers, which can be managed by the service provider and/or transferred to linked bank accounts (e.g., instantly, daily, etc.).

The service provider can additionally provide other services including, but not limited to, inventory management services, catalog management services, business banking services, financing services, lending services, reservation management services, estimating services, invoice services, web-development services, payroll services, employee management services, appointment services, loyalty tracking services, restaurant management services, order management services, fulfillment services, peer-to-peer payment services, onboarding services, identity verification (IDV) services, and so on. Additional details associated with such services are described below. In some examples, the service provider can track which services are used by individual buyers and/or sellers. In at least one example, the service provider can leverage information associated with buyers and/or sellers that utilize the services availed by the service provider to intelligently underwrite transactions to determine terms associated with tendering payment for such transactions, as described herein. For example, service usage by buyers and/or sellers can inform tender options as described herein. Furthermore, in some examples, service usage can inform incentives used for incentivizing payment for invoices as described herein.

As an example, a buyer can use one or more services of the service provider, such as a peer-to-peer payment service to transfer funds to other users and/or receive funds from other users. Furthermore, the buyer can transact with various sellers that use payment processing services of the service provider. In at least one example, the buyer can purchase an item from a seller that uses the payment processing services of the service provider. In at least one example, at the point-of-sale of the item, the service provider can access information associated with the buyer—which can be determined based on peer-to-peer payment transactions and/or other transactions processed by the service provider—to determine tender options for the buyer to tender payment for a cost of the item. Such tender options can include an option to pay via invoice. Furthermore, in at least one example, such tender options can include an option to pay using funds associated with an account, wherein the funds have been generated based on transactions associated with the peer-to-peer payment service. That is, the service provider can manage an account on behalf of the buyer whereby funds received from other users are stored. Such funds can be used to pay at least a portion of the cost of the item. In additional or alternative examples, such tender options can include an option to pay via a loan (or other lending product), which can be issued and/or managed by the service provider (e.g., lending services). The terms of the loan can be informed by information known about the buyer by the service provider (e.g., via the buyer's use of services availed by the service provider). That is, techniques described herein can intelligently determine tender options for the buyer to tender payment for the transaction based at least in part on the buyer's use of services provided by the service provider. Such determinations can be made in near real-time, at the point-of-sale of the item and/or at a time after the transaction.

As described above, in some examples, the service provider can track invoices on behalf of sellers and/or enable sellers to track invoices via an invoice hub. That is, the service provider can send an invoice for a seller and monitor if/when the invoice is paid. In some examples, the service provider can enable the seller to monitor payment of invoices via the invoice hub. In some examples, a buyer may not tender payment for an invoice when the invoice is due (e.g., the invoice is outstanding). In at least one example, the service provider can send one or more reminders to the buyer (e.g., on behalf of the seller and/or responsive to instruction from the seller). Furthermore, in at least one example, the service provider can track operating conditions of sellers. In some examples, a seller may use appointment services of the service provider, estimating services of the service provider, business banking services of the service provider, etc. The service provider can determine, based on tracking the seller's use of the service provider's services, if/when an operating condition of the seller changes and/or is likely to change. Such an operating condition can comprise cash flow, debt, accounts receivable, etc. If payment of a particular invoice can mitigate and/or offset the change in the operating condition of the seller, the service provider can recommend that the seller offer an incentive to incentivize the buyer to tender payment for the invoice. In some examples, the determination of whether to recommend an incentive and/or what incentive to recommend can depend on information associated with the buyer, seller, and/or invoice. In at least one example, such an incentive can include a discount on the invoice—or some other modification of a term of the invoice, an avoidance of a penalty fee, a discount on a future transaction with the seller, a discount on a future transaction with a different seller, a loyalty credit, or the like. That is, techniques described herein can intelligently determine whether/when to offer an incentive and terms of the incentive, which enables the creation of a dynamic invoice with terms that adapt based at least in part on changing conditions of a seller.

As described above, techniques described herein are directed to intelligently generating and/or managing invoices. In conventional invoice technologies, sellers are able to invoice buyers in an effort to collect funds for items provided to buyers by such sellers. With conventional technologies, buyers do not have an option with respect to tendering payment. That is, conventional technologies enable buyers to tender payment via cash, check, or credit card (which is a one-size-fits-all model), but such conventional technologies do not personalize and/or customize tender options for buyers based on information about the buyers, sellers, and/or transactions for which payment is to be tendered. That is, conventional technologies do not utilize a network-based seller environment to generate and/or access transaction data for multiple, different sellers (and buyers) for determining personalized and/or customized tender options. Techniques described herein can leverage transaction data—and other data associated with buyers and/or sellers that use services of a service provider—to generate customized and/or personalized tender options for tendering payment for transactions, which is an improvement over one-size-fits-all invoices that are availed via conventional technologies. Furthermore, such determinations (e.g., regarding tender options) can be made in near real-time, or on the fly, thereby reducing friction and resources associated with invoice generation and/or management.

In existing technologies, buyers can receive invoices and, in some examples, are required to interact with various user interfaces to tender payment for such invoices. For example, a buyer can receive an invoice, which includes a link to a payment user interface. The buyer is then prompted to input payment data for tendering payment via the payment user interface. By integrating customized and/or personalized tender options into digital invoices, buyers can more easily tender payment for associated transactions. For instance, in some examples, buyers can tender payment for an invoice via payment information associated with a stored card-on-file (e.g., payment data associated with a payment instrument that is stored by the payment processing service). Furthermore, in some examples, a buyer can tender payment for an invoice using an identifier that uniquely identifies the buyer and payment information associated therewith. In some examples, a buyer can tender payment for an invoice via a single interaction with a digital invoice. That is, techniques—and associated graphical user interfaces (GUIs)— described herein enable improved interactions between buyers and digital invoices, thereby offering improvements to existing technologies.

Techniques described herein offer various benefits to entities associated with the network-based seller environment described herein. For instance, by providing customized and/or personalized tender options, techniques described herein provide buyers with choices regarding how—and in some examples, when—they can tender payments for transactions. The intelligent presentation of such tender options therefore reduces friction caused by conventional invoicing technologies and provides a real-time and personalized payment flow for invoice and payment settlement for buyers. Furthermore, techniques described herein can enable centralized invoice management which increases the likelihood that sellers are paid and decreases the time and computing resources invested (by sellers) in tracking down payment (e.g., sending electronic email reminders, text messages to buyer, etc.). That is, embodiments described herein help to also reduce network congestion and conserve network bandwidth, which is problematic in prior invoice management systems where numerous communication reminders must be sent between thousands of buyers and sellers. In some examples, techniques described herein can leverage machine learning algorithms combined with transaction data—and other data associated with buyers and/or sellers that use services of a service provider—to generate customized and/or personalized incentives to incentivize tendering payment for transactions. This distributed networking architecture for invoice management described herein is an improvement over conventional technologies, which do not avail such dynamic and/or intelligent determination of when/what to incentivize to motivate buyers to tender payment for invoices in a time-sensitive manner (and thereby help operating conditions of sellers).

Additional benefits and efficiencies are described throughout this disclosure.

FIG. 1 illustrates an example environment 100 for intelligent invoice generation and/or management using techniques described herein. FIG. 1 includes a buyer 102 and a seller 104. The buyer 102 can be an entity that purchases, leases, borrows, or otherwise acquires items from sellers, such as the seller 104. The seller 104 can be an entity that sells, leases, gives, or otherwise provides items to buyers, such as the buyer 102. "Item," as used herein, can be used to describe a good or a service.

In at least one example, the buyer 102 can interact with one or more buyer computing devices 106, for example, via a buyer user interface 108. The buyer user interface 108 can enable the buyer 102 to access services of the service provider and/or otherwise interact with the service provider. In some examples, as described below, the buyer user interface 108 can be presented via an application provided by the service provider. In such an example, such an application can be a hub for buyer interactions with the service provider. That is, the buyer 102 can access one or more services of the service provider via the application. As an example, the buyer 102 can access rewards, loyalty, invoices (e.g., paid/unpaid), receipts, orders (e.g., fulfilled/unfulfilled), account information (e.g., funds associated therewith), and the like. In at least one example, the buyer user interface 108 can present a digital invoice to the buyer 102, to enable the buyer 102 to tender payment for the invoice via interaction with the buyer user interface 108.

In at least one example, the seller 104 can interact with one or more seller computing devices 110, for example, via a payment processing user interface 112 and/or an invoice user interface 114. The payment processing user interface 112 can enable the seller 104 to access payment processing services provided by the service provider. The invoice user interface 114 can enable the seller 104 to generate and/or manage invoices.

In at least one example, a user interface, such as the buyer user interface 108, the payment processing user interface 112, and/or the invoice user interface 114, can be presented via a web browser, or the like. In other examples, a user interface can be presented via an application, such as a mobile application or desktop application, which can be provided by the service provider or which can be an otherwise dedicated application. In some examples, individual of the computing device(s) can have an instance or versioned instance of an application, which can be downloaded from an application store, for example, which can present the user interface(s) described herein. In at least one example, the buyer 102 can interact with the buyer user interface 108 and/or the seller 104 can interact with the payment processing user interface 112 and/or the invoice user interface 114 via touch input, spoken input, or any other type of input.

In at least one example, the environment 100 can include server computing device(s) 118, which can be in communication with the buyer computing device(s) 106 and/or the seller computing device(s) 110 via network(s) 120 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). In at least one example, the server computing device(s) 118 can be associated with the service provider described herein. In some examples, actions attributed to the service provider can be performed by the server computing device(s) 118. However, in other examples, actions attributed to the service provider can be performed by an agent of the service provider (e.g., an employee, an independent contractor, etc.). The server computing device(s) 118 can include a seller module 122 and an invoice module 124. Further, the server computing device(s) 118 can be associated with a datastore 126.

In at least one example, the seller module 122 can provide one or more services for sellers associated with the service provider, which can include payment processing services. That is, the seller module 122 can, among other things, process transactions for sellers associated with the service provider. In at least one example, the seller module 122 can transmit requests (e.g., authorization, capture, settlement, etc.) to payment service server computing device(s) (not illustrated in FIG. 1) to facilitate transactions between sellers and buyers, such as the seller 104 and the buyer 102. The seller module 122 can communicate the successes or failures of the transactions to the seller computing device(s) 110. In at least one example, the seller module 122 can generate and/or receive transaction data associated with transactions processed on behalf of the seller 104 (and/or other, different sellers as described below) that utilize the service provider for processing transactions. In at least one example, such transaction data can include payment data, which can be obtained from a reader device associated with one of the seller computing device(s) 110 or otherwise provided to the service provider, user authentication data, purchase amount information, point-of-purchase information (e.g., item(s) purchased, date of purchase, time of purchase, parties to the transaction, etc.), etc. In some examples, the transaction data can be stored in the datastore 126.

The seller module 122 can additionally enable sellers to access or otherwise use services including, but not limited to, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the seller module 122 can provide an integration mechanism to enable the seller 104 to use their own services and provide data associated with such services to the seller module 122. In at least one example, each of the services above can be associated with their own module (as opposed to being availed via the seller module 122). Data associated with such services of the service provider and/or integrated with the service provider can be stored in the datastore 126. Additional details associated with such services are described below.

The invoice module 124 can facilitate the generation, transmission, and management of invoices. In at least one example, the invoice module 124 can present GUIs, such as those described below with reference to FIGS. 2-7, via respective user interfaces (e.g., the invoice user interface 114 or the buyer user interface 108) of the seller computing device(s) 110 or the buyer computing device(s) 106 to facilitate the generation, transmission, and management of invoices. Additional details associated with such generation, transmission, and management of invoices are described below with reference to FIGS. 2-7.

The datastore 126, which can be integrated with the server computing device(s) 118 and/or otherwise accessible to the server computing device(s) 118, can store data including, but not limited to profile data. Profile data can be associated with profiles of seller(s) and/or buyer(s). The datastore 126 can store additional or alternative types of data as described herein.

Seller profiles can store, or otherwise be associated with, data associated with sellers. For instance, a seller profile can store, or otherwise be associated with, information about a seller (e.g., name of the seller, geographic location of the seller, operating hours of the seller, employee information, etc.), a seller category classification (MCC), item(s) offered for sale by the seller, hardware (e.g., device type) used by the seller, transaction data associated with the seller (e.g., transactions conducted by the seller, payment data associated with the transactions, items associated with the transactions, descriptions of items associated with the transactions, itemized and/or total spends of each of the transactions, parties to the transactions, dates, times, and/or locations associated with the transactions, etc.), invoice information associated with the seller (e.g., invoices sent, paid, incentives associated therewith, etc.), estimate information associated with the seller (e.g., estimates sent, estimates converted into invoices, etc.), loan information associated with the seller (e.g., previous loans made to the seller, previous defaults on said loans, etc.), risk information associated with the seller (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations information (e.g., previous reservations, upcoming (scheduled) reservations, interactions associated with such reservations, etc.), inventory information, buyer service information, etc. The seller profile can securely store bank account information as provided by the seller. Further, the seller profile can store payment information associated with a payment instrument linked to an account of the seller that is maintained by the service provider.

Buyer profiles can store, or otherwise be associated with, data associated with buyers. For instance, such buyer data can include, but is not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), loan information associated with the buyer (e.g., previous loans made to the buyer, previous defaults on said loans, etc.), risk information associated with the buyer (e.g., indications of risk, instances of fraud, chargebacks, etc.), appointments information (e.g., previous appointments, upcoming (scheduled) appointments, timing of appointments, lengths of appointments, etc.), payroll information (e.g., employers, payroll frequency, payroll amounts, etc.), reservations information (e.g., previous reservations, upcoming (scheduled) reservations, reservation duration, interactions associated with such reservations, etc.), buyer service information, etc.

In at least one example, the buyer 102 can acquire one or more items from the seller 104 via a transaction 128. In at least one example, the transaction 128 can be associated with transaction data, which can include, purchase amount information (e.g., a cost associated with the transaction 128), point-of-purchase information (e.g., item(s) purchased, date of purchase, time of purchase, parties to the transaction. etc.), etc. In at least one example, techniques described herein can present one or more tender options to enable the buyer 102 to tender payment to the seller 104 for a transaction 128. One such tender option can include an invoice which, in some examples, can be a digital invoice that enables the buyer 102 to pay for the transaction on the buyer computing device(s) 106. An invoice, for the purpose of this discussion, is a data structure that enables the buyer 102 to tender payment for a transaction over a network at a time after the transaction at the point-of-sale.

FIGS. 2-7 illustrate various example GUIs that can be presented to facilitate the generation, transmission, and management of an invoice associated with such a transaction 128. FIGS. 2-7 illustrate example GUIs presented via respective user interfaces on the seller computing device(s) 110 or the buyer computing device(s) 106. The example GUIs are non-limiting examples such that additional or alternative information can be presented via such GUIs. Furthermore, GUIs can be associated with additional or alternative content and/or additional or alternative configurations.

Figure 2B:
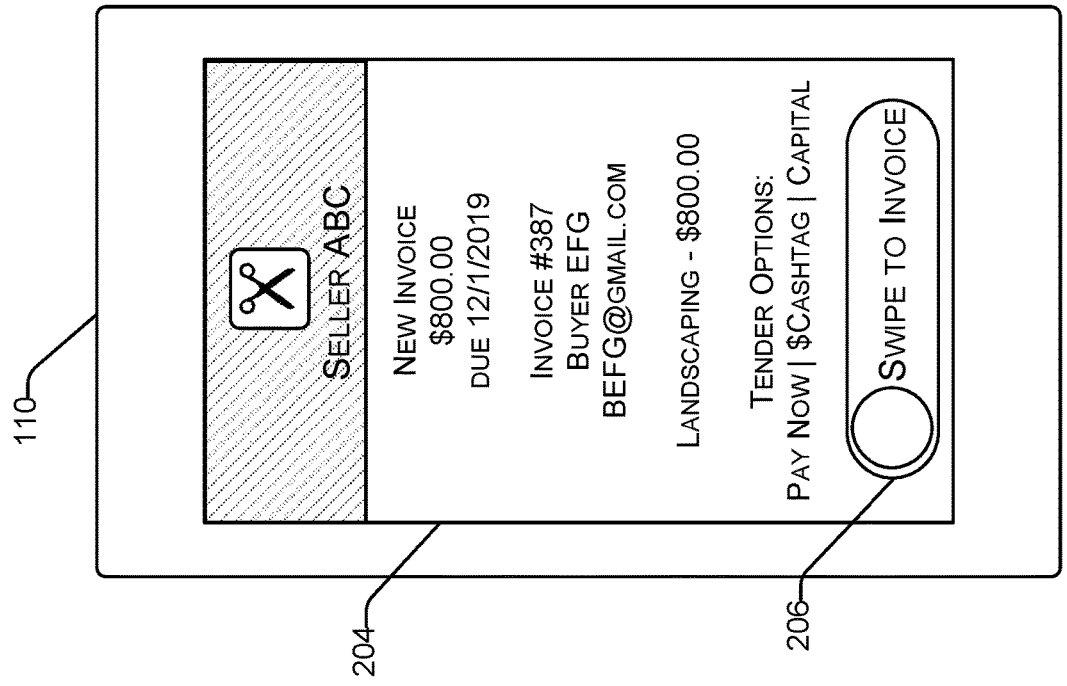
FIG. 2B illustrates another example GUI for generating an invoice as described herein.
Figure 2A:
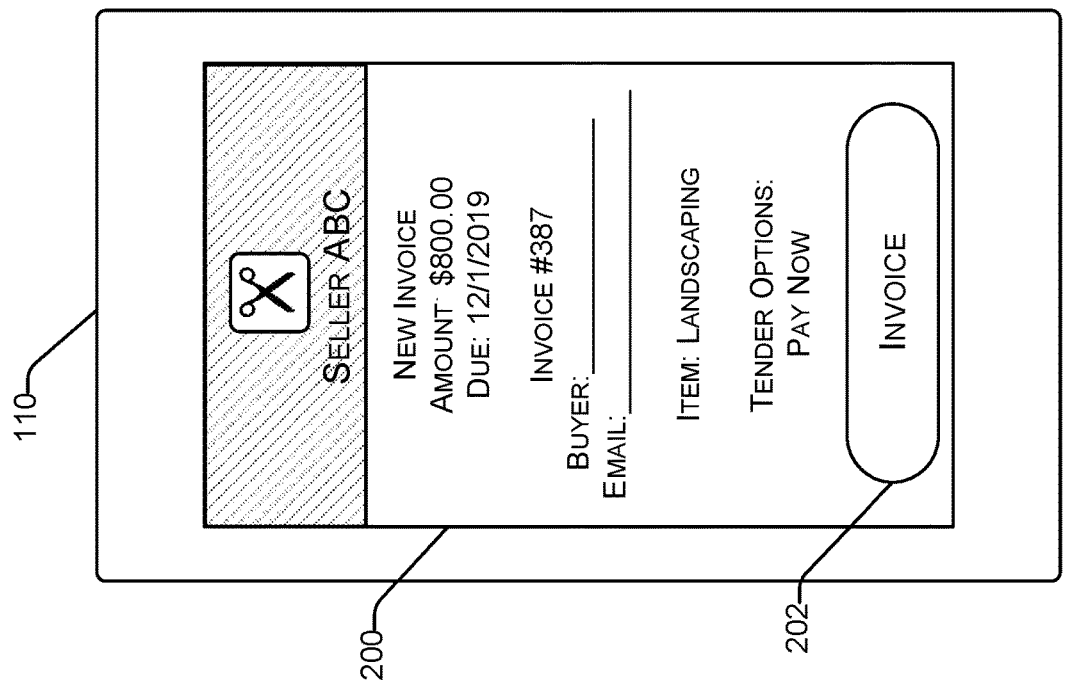
FIG. 2A illustrates an example graphical user interface (GUI) for generating an invoice as described herein.

FIG. 2A illustrates an example GUI 200 for generating an invoice as described herein. In at least one example, the seller 104 can interact with the invoice user interface 114 to generate an invoice. In some examples, the payment processing user interface 112 can provide transaction data associated with a transaction, such as the transaction 128, to the invoice module 124. As described above, transaction data can include, but is not limited to purchase amount information, point-of-purchase information (e.g., item(s) purchased, date of purchase, time of purchase, parties to the transaction, etc.), etc. In some examples, receipt of such transaction data can initiate invoice generation. That is, the invoice module 124 can generate invoices in association with individual transactions without explicitly receiving instructions from the seller 104 to generate such invoices (e.g., the seller is utilizing an invoice-specific service). In some examples, the seller 104 can interact with the invoice user interface 114 to request to generate a new invoice.

In other examples, invoice generation can be initiated responsive to a selection of an invoice tender option at a point-of-sale associated with the transaction 128, additional details of which are described below. That is, in some examples, the invoice module 124 can receive transaction data and can determine whether an invoice is a tender option for a transaction. In some examples, such a determination can be based on information associated with the transaction 128 (e.g., total cost, item(s) purchased, etc.), information associated with the seller 104, and/or information associated with the buyer 102 (if known). If an invoice is a tender option for the transaction 128, such an option can be presented via the invoice user interface 114, for example, at the point-of-sale of the transaction 128. If the buyer 102 or the seller 104 opts for the invoice tender option, the invoice user interface 114 can send an indication of such to the invoice module 124 to initiate invoice generation.

In at least one example, the datastore 126 can store templates of invoices. In some examples, a seller, such as the seller 104, can have customized or personalized an invoice template and such a seller-specific invoice template can be stored in association with an indication of the seller 104 in the datastore 126. In other examples, the invoice module 124 can generate a seller-specific invoice template for the seller 104. In some examples, the invoice module 124 can utilize information associated with similar sellers to generate the seller-specific invoice template for the seller 104. That is, in some examples, the invoice template for the seller 104 can be determined based at least in part on invoice templates associated with other, different sellers, similar to the seller 104. In at least one example, invoice template(s) can be mapped to, or otherwise associated with, seller profiles.

In some examples, the invoice module 124 can determine an identity of the seller 104 from the transaction data and/or an identifier associated with a device from which the transaction data was sent (e.g., the seller computing device(s) 110). The invoice module 124 can access the invoice template(s) that are mapped to, or otherwise associated with, a profile of the seller 104 based at least in part on the identity of the seller 104 and/or the identifier associated with the device from which the transaction data was sent.

In at least one example, the invoice module 124 can populate at least a portion of information associated with an invoice template based at least in part on the transaction data. That is, in at least one example, the invoice module 124 can auto-populate an amount of the invoice (e.g., $800), item(s) associated with the invoice (e.g., landscaping), etc. based at least in part on the transaction data associated with the transaction to which the invoice corresponds. In at least one example, the invoice module 124 can cause the invoice template to be presented via the invoice user interface 114. In some examples, the seller 104 may provide additional details and/or edit the auto-populated invoice template via the invoice user interface 114. For instance, in FIG. 2A, the seller 104 can input the buyer's name and email address. In at least one example, based at least in part on the seller 104 inputting such information, such information can be associated with a profile of the buyer 102, which can be stored in the datastore 126, and/or can be presented via the invoice template.

In at least one example, the GUI 200 can include an actuation mechanism 202 that when actuated, causes an invoice to be generated and, in some examples, sent, or otherwise presented, to a buyer, such as the buyer 102. In such an example, the invoice module 124 can send, or otherwise facilitate the transmission of, the invoice to the buyer computing device(s) 106 and the invoice can be presented via the buyer user interface 108. In at least one example, the invoice module 124 can send the invoice as a text message, email, push notification, and/or an in-application notification. In at least one example, the invoice can be a digital invoice that enables the buyer to pay for the associated transaction via an interaction with the digital invoice. Additional details are provided below.

In some examples, if the transaction data includes an indication of the buyer, such as the buyer 102, the invoice module 124 can add information associated with the buyer 102 to the invoice template automatically (e.g., without additional input from the seller 104). For example, FIG. 2B illustrates another example GUI 204 for generating an invoice as described herein. As illustrated in FIG. 2B, the invoice template presented via the GUI 204 includes an identity of the buyer 102 (e.g., Buyer EFG) and the buyer's email address (e.g., BEFG@gmail.com).

In at least one example, the invoice module 124 can determine one or more tender options associated with the transaction 128. In some examples, the invoice module 124 can determine one or more tender options based at least in part on information associated with the transaction 128, information associated with the seller 104, and/or information associated with the buyer 102. In at least one example, the invoice module 124 can utilize a machine-trained model to intelligently determine tender options available for transactions, as described herein. In at least one example, tender options can be presented via the invoice template, as is illustrated in FIG. 2B (e.g., pay now, $cashtag, Capital).

As described above, in some examples, the invoice module 124 can determine one or more tender options based at least in part on information associated with the transaction 128. For instance, if a transaction meets or exceeds a threshold, an invoice option or an option to pay via a loan (or other lending product) provided by the service provider can be availed to the buyer 102. In some examples, the invoice module 124 can determine one or more tender options based at least in part on information associated with the seller 104. In at least one example, the invoice module 124 can access a profile associated with the seller 104 to determine information associated with the seller 104 and determine tender options based at least in part on such information. For instance, sellers associated with a same MCC may be able to provide an invoice option and/or sellers with cash flows the meet or exceed a threshold may be able to offer buyers loans that are provided by the service provider. In some examples, the invoice module 124 can determine one or more tender options based at least in part on information associated with the buyer 102. In at least one example, the invoice module 124 can access a profile associated with the buyer 102 to determine information associated with the buyer 102. In some examples, such information can include service(s) of the service provider used by the buyer 102, cash flow of the buyer 102, current or previous loans associated with the buyer 102, linked bank account information, and the like. In at least one example, the invoice module 124 can underwrite the buyer 102, based at least in part on the information associated with the buyer 102, to determine tender options available for the buyer 102 for the transaction 128.

In at least one example, the GUI 204 can include an actuation mechanism 206 that, when actuated, causes an invoice to be generated, and in some examples, sent, or otherwise presented, to a buyer, such as the buyer 102. In some examples, an actuation mechanism can be a button or control such as the one illustrated in FIG. 2A (e.g., actuation mechanism 202). In additional or alternative examples, an actuation mechanism can be a slider that enables the seller 104 to swipe to generate an invoice such as the one illustrated in FIG. 2B (e.g., actuation mechanism 206). In at least one example, responsive to actuation of the actuation mechanism 206, the invoice module 124 can generate an invoice.

In some examples, responsive to actuation of the actuation mechanism 206 (or actuation mechanism 202), the invoice module 124 can receive an indication of such and can generate an invoice. In some examples, the invoice module 124 may not send the invoice immediately and may store the invoice for sending and/or presenting at a later time. In at least one example, invoices can be sent at a particular frequency, after a lapse of a period of time, on a particular day, etc. In some examples, the invoice module 124 can send an invoice to the buyer computing device(s) 106 and/or the seller computing device(s) 110.

In some examples, the invoice module 124 can send, or otherwise facilitate the transmission of, the invoice to the buyer computing device(s) 106. In at least one example, the invoice module 124 can send the invoice as a text message, email, push notification, and/or an in-application notification. As described herein, in at least one example, the invoice can be presented via the buyer user interface 108. In at least one example, the invoice can be a digital invoice that enables the buyer to pay for the associated transaction via an interaction with the digital invoice. Additional details are provided below.

In some examples, the invoice module 124 can send, or otherwise facilitate the transmission of, the invoice to the seller computing device(s) 110. For example, the invoice module 124 can receive a request from the seller computing device(s) 110 for one or more invoices associated with a buyer, such as the buyer 102. That is, the buyer 102 can provide an identifier (e.g., an email address, a phone number, an alphanumeric identifier, a Quick Response (QR) code, a barcode, etc.) associated with the buyer 102 at the point-of-sale (e.g., via interaction with the seller computing device(s) 110). The payment processing user interface 112 can send the identifier to the server computing device(s) 118, with a request for one or more invoices associated with the identifier. The invoice module 124 can access one or more invoices associated with a profile of the buyer 102 (e.g., which can be associated with the seller 104 or other, different sellers associated with the service provider) and can send the one or more invoices to the payment processing user interface 112. In such an example, the payment processing user interface 112 can cause the one or more invoices to be presented via a display associated with the seller computing device(s) 110. For instance, the one or more invoices can be presented via a customer-facing display of the seller computing device(s) 110 so as to avoid presenting the invoice(s) to the seller 104. In such an example, the buyer 102 can tender payment for one or more invoices—which can be associated with the seller 104 or not—via a transaction at the seller computing device(s) 110.

In at least one example, the invoice module 124 can access or otherwise receive information the can be associated with an invoice via additional or alternative mechanisms than those described above with reference to FIGS. 2A and 2B. For instance, in at least one example, the seller computing device(s) 110 can include a camera or other image capturing device, the functionality of which can be accessible to or integrated with the invoice user interface 114. In such an example, the seller 104 can capture an image of an invoice (e.g., a paper invoice) and transmit the image to the invoice module 124. In at least one example, the invoice module 124 can analyze the image to extract information from the image. For instance, the invoice module 124 can utilize image processing, text recognition, and the like to identify information that can be auto-populated into an invoice template.

As another example, the service provider can provide an estimate service whereby sellers can provide estimates for items to be provided to buyers at a future time. In such an example, the seller 104 can interact with an interface to provide data associated with an estimate (e.g., goods/services to be provided, a total cost of the goods/services, a timeline associated with providing the goods/services to the buyer 102, information associated with the buyer 102, etc.). In at least one example, such data can be used to populate an invoice template and thus generate a new invoice. That is, in some examples, a new invoice can be generated based at least in part on a previously provided estimate (and data associated therewith). In some examples, such an invoice can be generated after the goods/services are provided to the buyer 102 (e.g., which can be determined based on data associated with the estimate and/or appointment data, as described herein).

Furthermore, in some examples, an invoice can be generated based at least in part on a user interacting with a user interface to indicate a desire to make a donation. In such an example, an invoice can be generated responsive to such an indication.

Figure 3B:
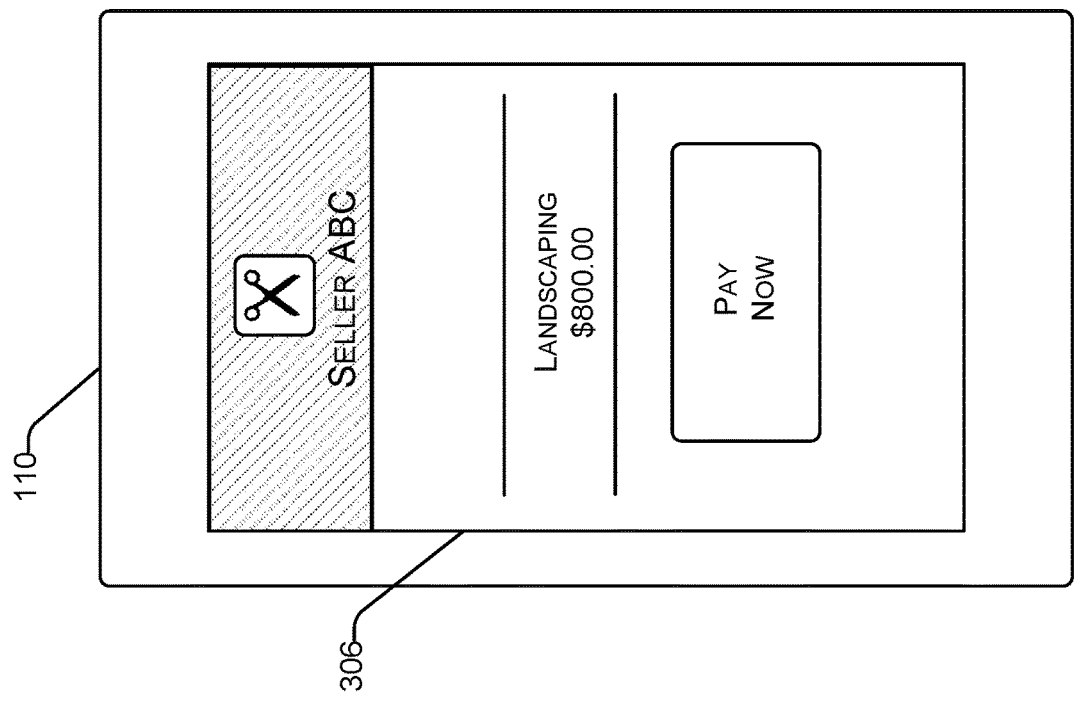
FIG. 3B illustrates another example GUI for presenting option(s) for tendering payment for a transaction as described herein.
Figure 3A:
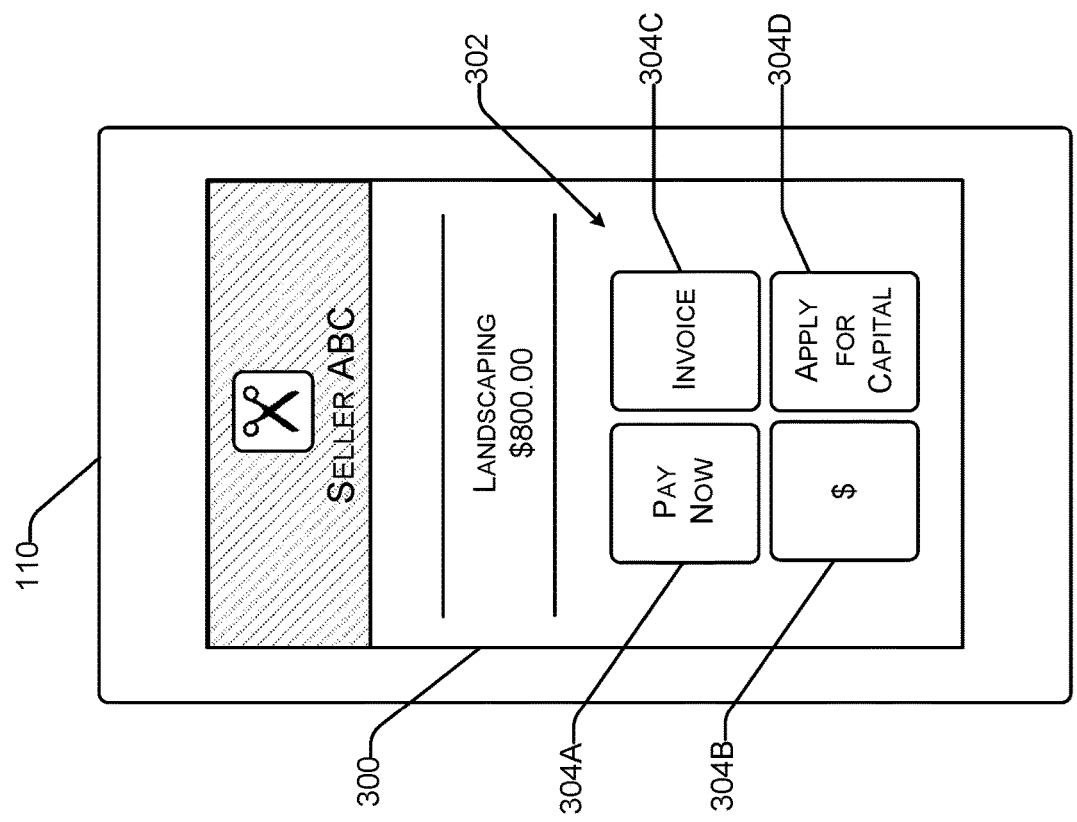
FIG. 3A illustrates an example GUI for presenting option(s) for tendering payment for a transaction as described herein.

FIG. 3A illustrates an example GUI 300 for presenting option(s) for tendering payment for a transaction as described herein. As described above, in at least one example, the invoice module 124 can determine one or more tender options associated with the transaction 128. In at least one example, if the identity of the buyer 102 is known, the invoice module 124 can access a profile associated with the buyer 102 to determine information associated with the buyer 102. As described above, in at least one example, the invoice module 124 can underwrite the buyer 102, based at least in part on the information associated with the buyer 102, to determine tender options available for the buyer 102 for the transaction 128. In some examples, the combination of tender options can be based at least in part on services of the service provider used by the buyer 102. For example, a buyer 102 that has a risk profile (e.g., which can be determined based at least in part on data associated with interactions between the buyer 102 and the service provider) indicating that the buyer 102 is likely to tender payment (e.g., low risk) can be presented with a tender option for an invoice. Moreover, in at least one example, if the buyer 102 uses a peer-to-peer payment service of the service provider, the buyer 102 may have an account associated with funds received by other users (not transferred to a linked bank account) that is managed by the service provider. In such an example, the buyer 102 can be presented with an option to use such funds to tender payment for the transaction. In some examples, the tender options can be determined based at least in part on information associated with the transaction 128 and/or the seller 104. In at least one example, tender options can be presented at a point-of-sale, for example, via the invoice user interface 114.

As illustrated in FIG. 3A, there are four tender options 302 available for the transaction 128: (i) pay now (e.g., via cash, check, or credit card), (ii) invoice, (iii) access funds associated with an account managed by the service provider ("$"), or (iv) apply for capital (e.g., a loan, or other lending product, available from the service provider). Of course, additional or alternative tender options can be presented to the buyer 102. In at least one example, each of the four tender options 302 can be associated with an actuation mechanism (e.g., 304A-304D), the actuation of which can initiate a payment flow for tendering payment via the selected tender option. While four tender options 302 are shown, any number of tender options can be presented via the GUI 300.

In an example, actuation of actuation mechanism 304A can initiate a payment flow where the seller 104 obtains payment data from the buyer 102 and the payment processing user interface 112 sends the payment data to the seller module 122 for processing. In some examples, the buyer 102 can provide payment data via an interaction between a payment instrument and a reader device associated with the seller computing device(s) 110 (e.g., a card present transaction). In other examples, the seller 104 or the buyer 102 can input payment data via an interaction with a user interface (e.g., a card-not-present transaction). In some examples, the buyer 102 can tender cash or a check to tender payment for the transaction 128.

Furthermore, actuation of actuation mechanism 304B can initiate a payment flow where the buyer 102 provides an identifier (e.g., an alphanumeric identifier which can be set by the buyer 102) that is associated with an account of the buyer 102 (e.g., the funds associated therewith having been generated based at least in part on peer-to-peer payment transactions) and the seller module 122 processes payment for the transaction 128 using funds associated with the account (e.g., the seller module 122 transfer an amount corresponding to the transaction 128, or a portion thereof, out of the account of the buyer 102 and into an account of the service provider). In some examples, such a tender option (e.g., to access funds associated with the account) can be presented based at least in part on determining that a balance of the account meets or exceeds the cost of the transaction 128. In some examples, such a tender option (e.g., to access funds associated with the account) can be presented based at least in part on determining that the balance associated with the account is greater than or equal to a portion of the cost of the transaction. In at least one example, the buyer 102 need not actuate the actuation mechanism 304B, but instead can send a text message, email, or other communication that includes the identifier to tender payment for the invoice. Furthermore, in some examples, the identifier may be known by the invoice module 124 and actuation of the actuation mechanism 304B can cause the seller module 122 to process the transaction 128 using the identifier responsive to the actuation mechanism 304B being actuated.

In at least one example, actuation of actuation mechanism 304C can initiate a payment flow associated with an invoice. That is, if the buyer 102 actuates the actuation mechanism 304C (e.g., selects an invoice tender option), the buyer 102 need not tender payment at the point-of-sale, and the payment processing user interface 112 can send an indication of such a selection to the invoice module 124. In at least one example, the invoice module 124 can generate an invoice, as described above. In at least one example, the invoice module 124 can associate a flag or other indicator with the transaction 128 and/or invoice such that the invoice module 124 sends the invoice to the buyer 102 at a time after the point-of-sale. Additional details are described below.

Actuation of actuation mechanism 304D can initiate a payment flow whereby the buyer 102 is prompted to apply for a loan (or other type of lending product) that is provided by the service provider. In such an example, the buyer 102 may provide information associated with a loan application and/or loan generation. If the buyer 102 is approved for the loan, the service provider can issue the loan such that funds resulting from the loan are used to tender payment for the transaction 128. In such an example, the loan can enter repayment and the buyer 102 can repay the service provider per repayment terms of the loan. In some examples, such a tender option may be presented only if the buyer 102 is previously determined to be approved for the loan. In other examples, such a tender option may be presented for buyers that are associated with a level of risk that meets or exceeds a threshold (e.g., as determined based at least in part on one or more risk signals). Furthermore, in some examples, such a tender option may be presented if the buyer 102 is associated with an account (e.g., having a balance) as described above, but the balance is less than the cost of the transaction.

Additional or alternative tender options can be presented via the GUI 300. For instance, in at least one example, an invoice tender option with an option to store a card-on-file can be presented via the GUI 300. Furthermore, in some examples, a recurring payment and/or recurring invoice tender option can be presented via the GUI 300.

FIG. 3B illustrates another example GUI 306 for presenting option(s) for tendering payment for a transaction as described herein. In some examples, a default tender option (e.g., not personalized and/or customized) can be presented at a point-of-sale. The GUI 306 illustrated in FIG. 3B can be an example of such a GUI 306. In at least one example, the GUI 306 can be presented if (i) the buyer identity is not available, and thus the invoice module 124 is not able to intelligently determine tender options based on the buyer information, or (ii) the buyer identity is known but the buyer information is such that additional or alternative tender option(s) are not available to the buyer. That is, the only tender option available for the buyer 102 is for the buyer 102 to pay at the point-of-sale.

Figures 4A, 4B:
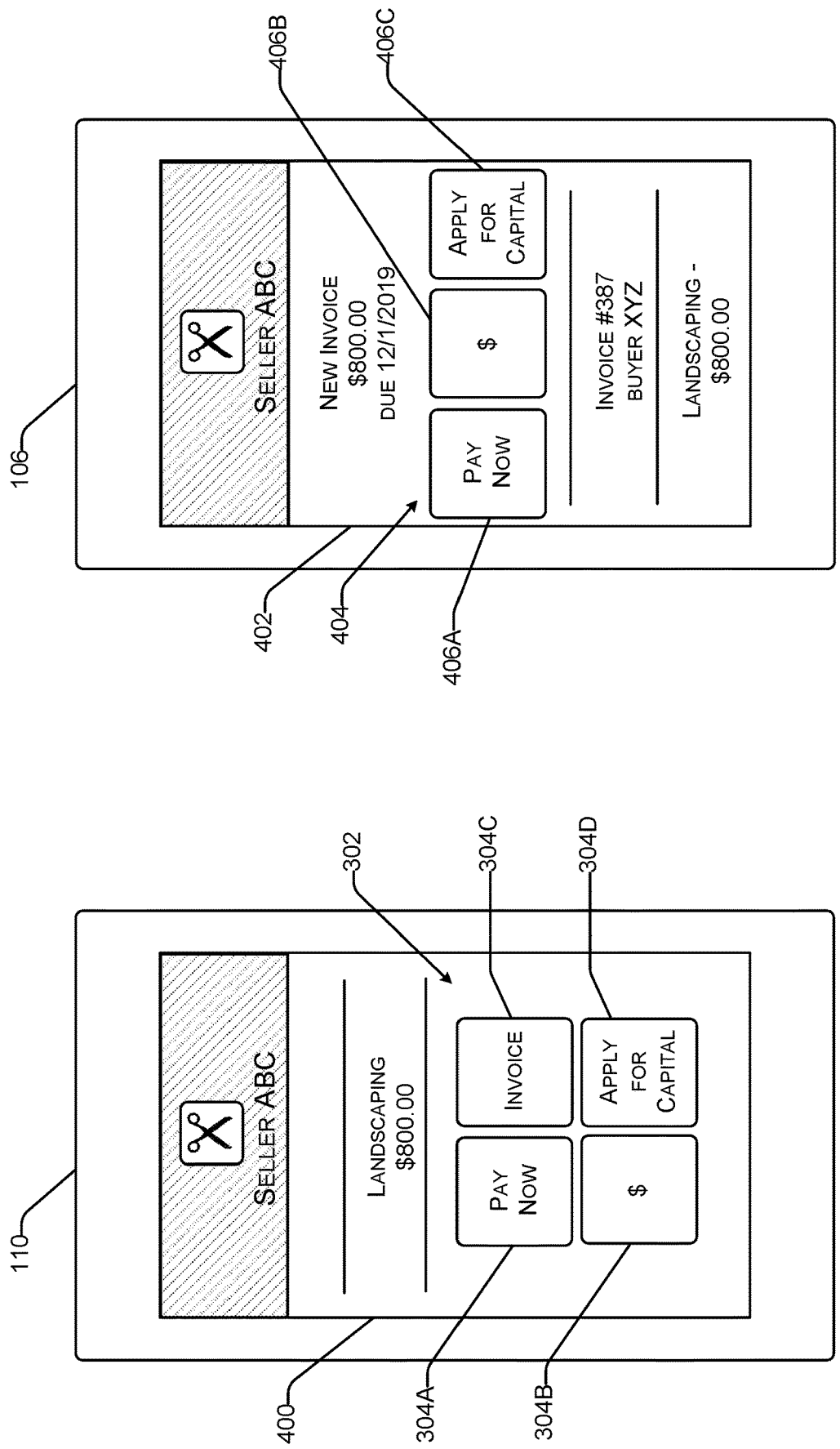
FIG. 4A illustrates an example GUI for presenting option(s) for tendering payment for a transaction as described herein.
FIG. 4B illustrates another example GUI for presenting option(s) for tendering payment for a transaction as described herein.

FIG. 4A illustrates an example GUI 400 for presenting option(s) for tendering payment for a transaction as described herein. Like FIG. 3A, the GUI 400 in FIG. 4A includes four tender options 302 that can be presented to the buyer 102, via the seller computing device(s) 110, at the point-of-sale. In at least one example, responsive to the buyer 102 selecting the tender option that enables the buyer 102 to tender payment via an invoice (e.g., actuating actuation mechanism 304C), the buyer 102 need not tender payment at the point-of-sale, and the payment processing user interface 112 can send an indication of such a selection to the invoice module 124. In at least one example, the invoice module 124 can generate an invoice, as described above.

FIG. 4B illustrates another example GUI 402 for presenting option(s) for tendering payment for a transaction as described herein. In at least one example, at some time after the point-of-sale, the invoice module 124 can send, or otherwise present, an invoice to the buyer 102. In some examples, the invoice can be associated with one or more tender options 404 for tendering payment for at least a portion of the transaction. In at least one example, the tender option(s) 404 presented via the GUI 402 can be the same, or a subset of, the one or more tender option presented at the point-of-sale (e.g., tender options 302). That is, in at least one example, the buyer 102 can select (e.g., via actuation of an actuation mechanism 406A-406C) a different tender option for tendering payment for the transaction 128 (or a portion thereof) via an interaction with the invoice and/or responsive to receiving the invoice via the buyer computing device(s) 106.

In some examples, the GUI 402 can present additional or alternative tender options, such as storing a payment instrument on-file (e.g., card-on-file) to tender payment for the invoice and/or future invoices, setting up recurring invoices, or the like. Furthermore, in at least one example, the tender option(s) 404 presented in association with the invoice can be different than the tender option(s) presented at the point-of-sale based at least in part on changes associated with the buyer 102 and/or the seller 104 between the point-of-sale and the time of invoice. For instance, the buyer's 102 risk profile can change between the point-of-sale and the time of invoice such that a loan (or other lending option) is no longer available. In such an example, such a tender option may not be available at the time of invoice.

Figure 5C:
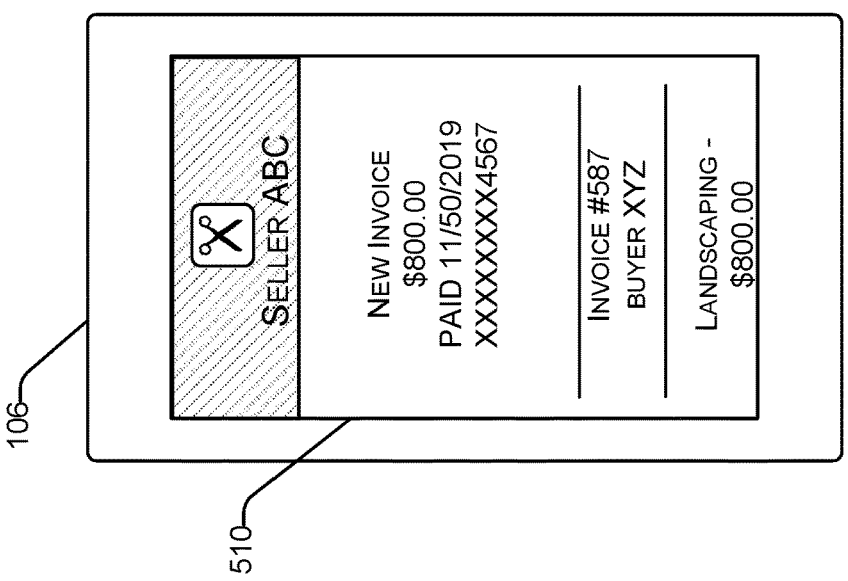
FIG. 5C illustrates another example GUI for presenting an indication that an invoice has been paid via an established card-on-file as described herein.
Figure 5B:
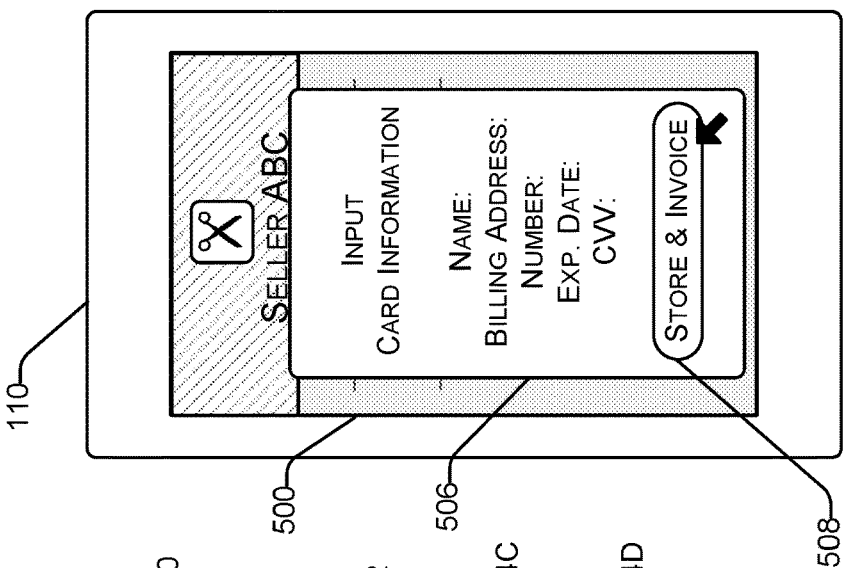
FIG. 5B illustrates another example GUI for generating an invoice in association with establishing a card-on-file as described herein.
Figure 5A:
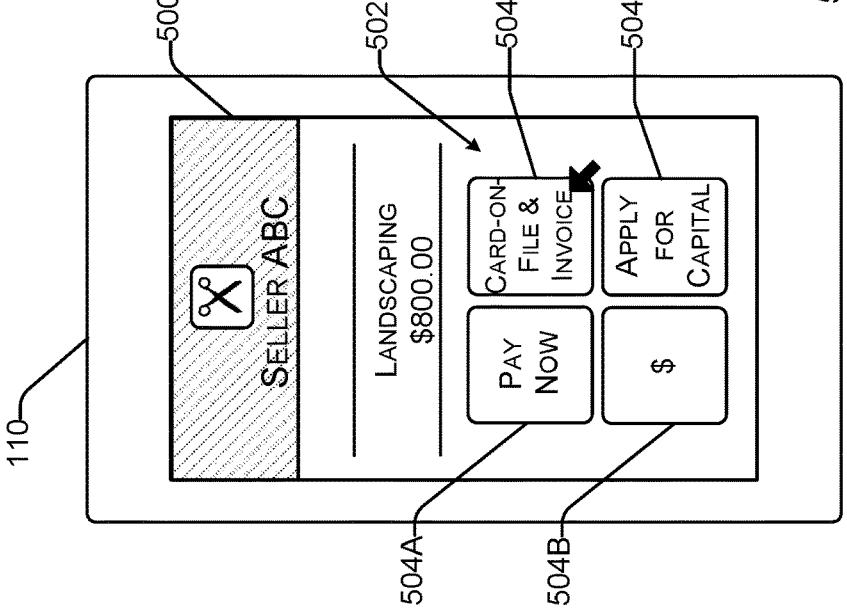
FIG. 5A illustrates an example GUI for generating an invoice in association with establishing a card-on-file as described herein.

FIG. 5A illustrates an example GUI 500 for generating an invoice in association with establishing a card-on-file as described herein. As described above, in at least one example, the invoice module 124 can determine one or more tender options associated with the transaction 128.

Similar to the tender options illustrated in FIG. 5A, there are four tender options 502 available for the transaction 128: (i) pay now (e.g., via cash, check, or credit card), (ii) card-on-file/invoice, (iii) access stored funds managed by the service provider ("$"), or (iv) apply for capital (e.g., a loan available from the service provider). Of course, additional or alternative tender options can be presented to the buyer 102. In at least one example, each of the four tender options 502 can be associated with an actuation mechanism (e.g., 504A-504D), the actuation of which can initiate a payment flow for tendering payment via the selected tender option. Payment flows associated with actuation of actuation mechanisms 504A, 504B, and 504D are described above with reference to FIG. 3.

Actuation of actuation mechanism 504C can enable the buyer 102 to add a payment instrument on-file (e.g., with the seller 104 and/or the service provider) and to be invoiced at a later time (e.g., sometime after the point-of-sale). Responsive to the buyer 102 selecting such a tender option, the invoice user interface 114 can cause a pop-up 506, overlay, or another GUI element to be presented to the buyer 102, prompting the buyer 102 to input payment data associated with a payment instrument (e.g., a credit card), as illustrated in FIG. 5B. In at least one example, responsive to the buyer 102 inputting payment data (and, in some examples, actuating an actuation mechanism 508), the payment data can be securely transmitted to the server computing device(s) 118 (e.g., via the invoice module 124) and stored in association with a profile of the buyer 102 (e.g., in the datastore 126). At a time after the payment data is received and/or stored, the invoice module 124 can access the payment data to tender payment for the transaction 128. That is, at some time after the point-of-sale associated with the transaction 128, the invoice module 124 can access the payment data to tender payment for the transaction 128 without requiring further input from the buyer 102. In such an example, the invoice module 124 can send an indication that an invoice has been paid using the stored payment data (e.g., card-on-file). Such an indication can be sent as a text message, email, push notification, in-application notification, or the like.

FIG. 5C illustrates an example GUI 510 for presenting an indication that an invoice has been paid via an established card-on-file as described herein. In at least one example, such a GUI 510 can be presented via the buyer user interface 108 of the buyer computing device(s) 106. Such a GUI 510 can include transaction data associated with the transaction 128, an invoice number, item(s) purchased via the transaction 128, a date the invoice was paid (e.g., 11/50/2019), payment data used to pay the invoice (e.g., 11/50/2019), and the like.

Figure 6B:
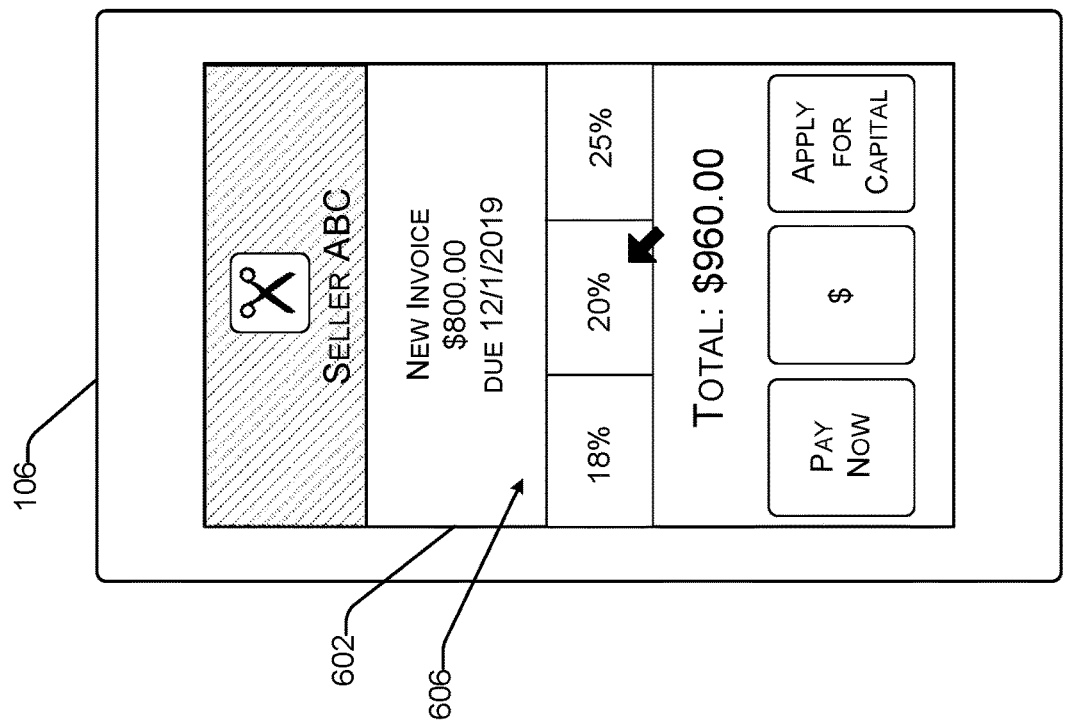
FIG. 6B illustrates another example GUI for presenting tipping option(s) in association with an invoice as described herein.
Figure 6A:
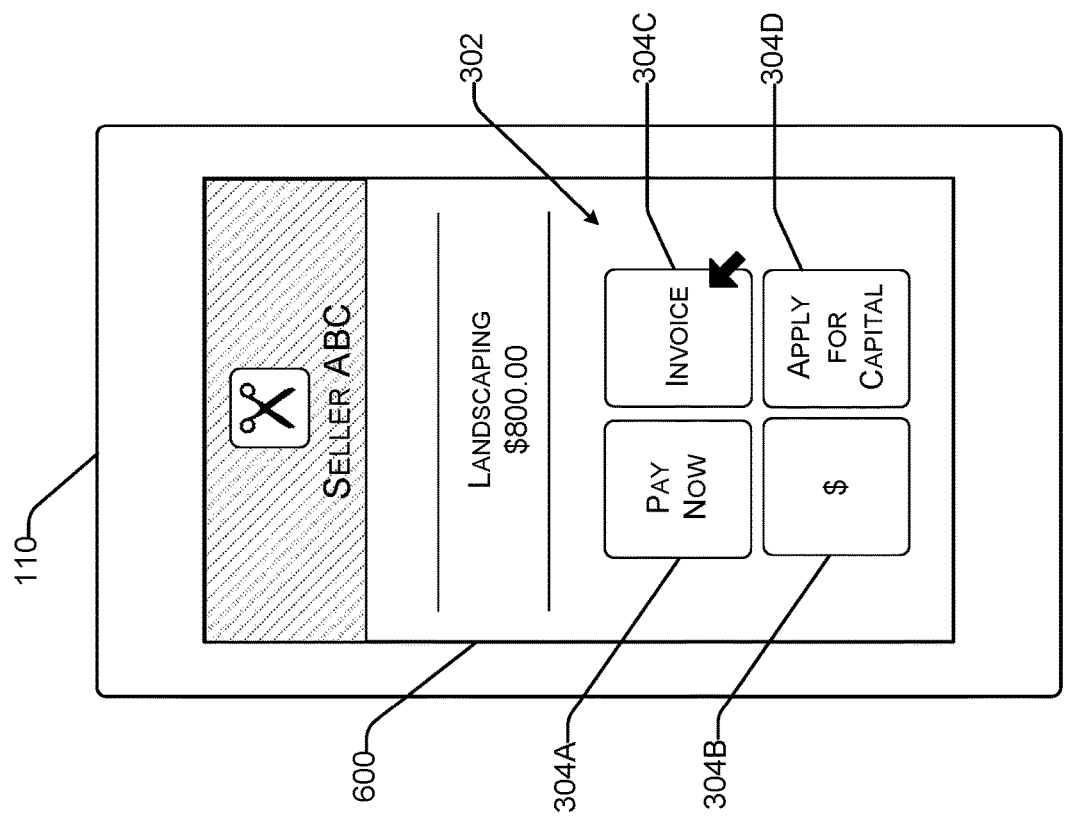
FIG. 6A illustrates an example GUI for presenting option(s) for tendering payment for a transaction as described herein.

FIG. 6A illustrates an example GUI 600 for presenting option(s) for tendering payment for a transaction as described herein. Like FIG. 3A, the GUI 600 in FIG. 6A includes four tender options 302 that can be presented to the buyer 102, via the seller computing device(s) 110, at the point-of-sale. In at least one example, responsive to the buyer 102 selecting the tender option that enables the buyer 102 to tender payment via an invoice (e.g., actuating actuation mechanism 304C), the buyer 102 need not tender payment at the point-of-sale, and the payment processing user interface 112 can send an indication of such a selection to the invoice module 124. In at least one example, the invoice module 124 can generate an invoice, as described above.

In some examples, the transaction can be associated with a service or other type of transaction where tipping (e.g., gratuity that is added on top of a payment amount) is appropriate. In some examples, an invoice can be associated with one or more tipping options to enable the buyer 102 to add a tip to a transaction. FIG. 6B illustrates an example GUI 602 for presenting tipping option(s) in association with an invoice as described herein. In at least one example, the buyer 102 may not be prepared to tip at the point-of-sale or at the time they tender payment in association with the invoice (e.g., the seller 104 has not yet performed the service or delivered the item to the buyer 102). That is, in some examples, the buyer 102 can tender payment for an invoice at a different time than when the item(s) associated with the transaction 128 are provided to the buyer 102 (e.g., the time of service is different from the time of payment). As such, the invoice module 124 can provide a tipping GUI, such as the tipping GUI 602, at some time after an item is provided to the buyer 102 to provide the buyer 102 with an opportunity to add a tip to the transaction 128. In at least one example, the tipping GUI 602 can be adaptive based at least in part on information associated with the transaction 128, context information associated with the invoice, receipt of payment of the invoice, and the like. In some examples, such a tipping GUI can be provided to the buyer 102 at a time informed by appointment data and/or estimate data (e.g., as soon as a service is completed, on a same day as a service is provided, a day after a service is provided, etc.).

In some examples, the tipping option can remain open for a period of time after the buyer 102 tenders payment for the invoice. For instance, if the buyer 102 provides payment data associated with a payment instrument for tendering payment for the invoice, the seller module 122 can send a request to authorize the payment data for a transaction 128. In some examples, the invoice module 124 can determine a tip determinant associated with the transaction 128. The tip determinant can be determined based at least in part on information associated with the buyer 102, the seller 104, and/or the transaction 128. In at least one example, the tip determinant can be determined using a machine-learned model, as described below. The invoice module 124 can provide the tip determinant to the seller module 122 and, in at least one example, the seller module 122 can authorize the payment data for the transaction and an additional amount based at least in part on the tip determinant. In such an example, the invoice can be associated with an open state until a time period during which the buyer 102 can tip lapses and/or until a tip is added to the invoice.

In some examples, whether to present a tipping GUI, the tip determinant, and/or individual tip amounts can be determined based at least in part on information associated with the buyer 102, the seller 104, and/or the transaction 128. For example, in some examples, the invoice module 124 can consider a length of time between when item(s) associated with the transaction 128 are provided to the buyer 102 and when the invoice is paid in determining whether to present a tipping GUI and/or the tip determinant. For instance, if the buyer 102 did not tender payment for the invoice until after a threshold period of time has lapsed, the invoice module 124 can determine not to present a tipping GUI (e.g., the buyer 102 may not have been satisfied with the item) and/or to modify the tip determinant (e.g., decrease). In some examples, appointments data and/or estimate data can indicate when an item was provided to the buyer 102.

In at least one example, the tipping GUI 602 can be presented to the buyer 102 and the buyer 102 can select a tip from tip amounts presented via the tipping GUI 602. In some examples, the GUI 602 can include one or more actuation mechanisms 606, the actuation of which adds a corresponding amount to the total transaction 128. For instance, in FIG. 6B, the buyer 102 selects a 20% tip, which is added to the original transaction 128 (e.g., $800). With the tip added, the invoice module 124 can notify the seller module 122 and the seller module 122 can process payment for the transaction 128 based at least in part on the new total transaction 128 (e.g., the cost of the item(s) and the added tip). That is, the seller module 122 can send a capture request to payment service server computing device(s) and settle the transaction based at least in part on sending the capture request to the payment service server computing device(s) (and the response therefrom).

In some examples, additional or alternative tender option(s) can be presented in association with the tipping GUI 602. In an example where the buyer 102 opts to tender payment via an option different than the buyer 102 uses to tender payment for the invoice, the seller module 122 can use the new form of tender to process the total transaction 128 (e.g., transaction 128 and tip) or to process the cost of the tip added to the transaction 128. In some examples, the seller module 122 can prompt the buyer 102 to confirm whether the buyer 102 desires to use the selected tender option to tender payment via an option different than the buyer 102 uses to tender payment for the invoice, the seller module 122 can use the new form of tender to process the total transaction 128 (e.g., transaction 128 and tip) or to process the tip added to the transaction 128.

Figures 7A, 7B:
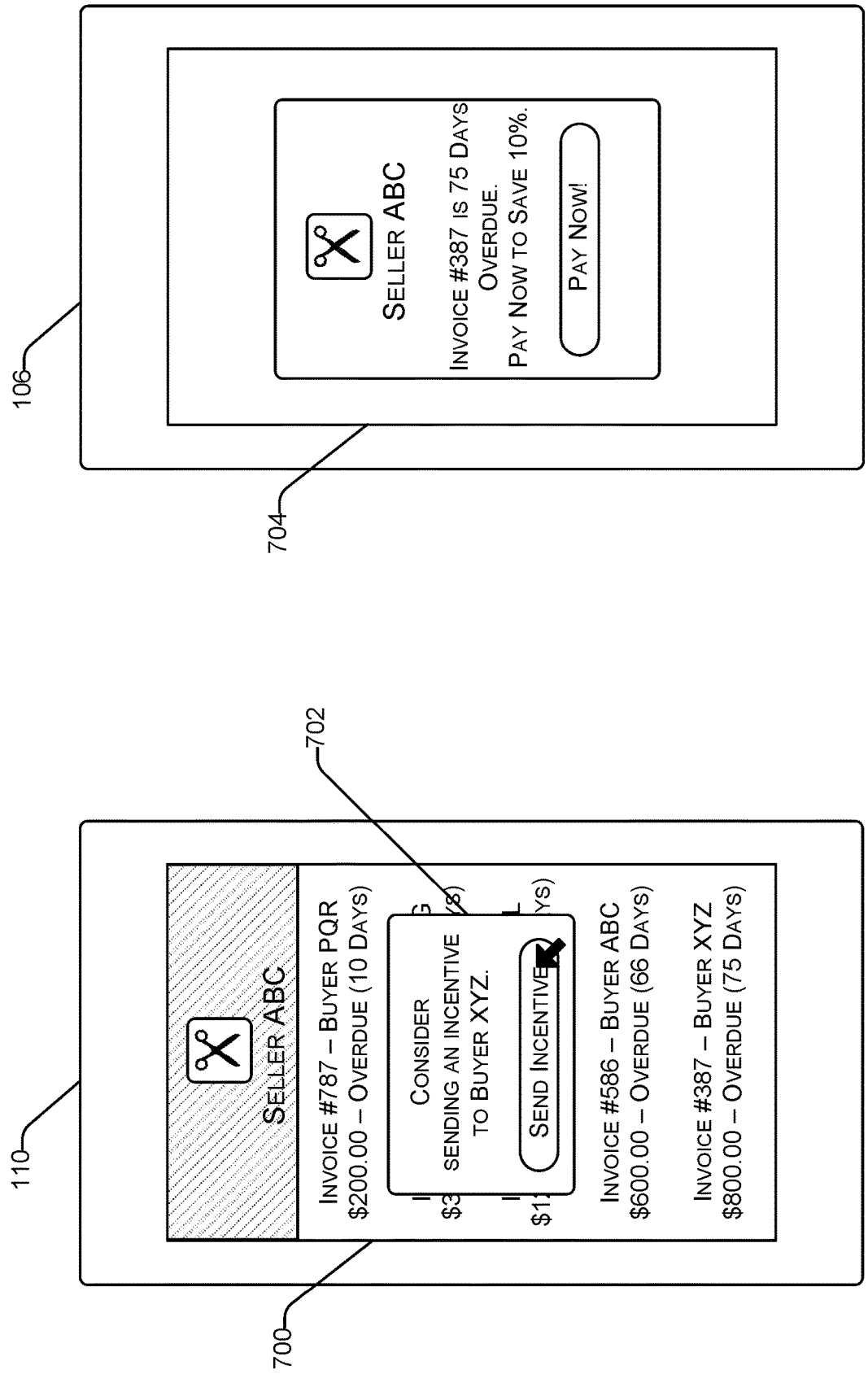
FIG. 7A illustrates an example GUI for presenting a recommendation to send an incentive to a buyer as described herein.
FIG. 7B illustrates an example GUI for presenting an incentive to a buyer as described herein.

FIG. 7A illustrates an example GUI 700 for presenting a recommendation to send an incentive to a buyer as described herein. As described above, in some examples, the invoice module 124 can provide invoice generation and/or management for sellers, such as the seller 104. In at least one example, the invoice module 124 can track outstanding invoices and can recommend that sellers provide incentives to incentivize buyers to tender payment for the outstanding invoices. In some examples, the invoice module 124 can access information associated with the seller 104 to track and/or otherwise monitor changes to operating conditions of the seller 104. In at least one example, such operating conditions can include cash flow, debt, accounts receivable, etc. In an example, the invoice module 124 can access appointment data associated with the seller 104 and can identify an upcoming appointment that requires the seller 104 to purchase supplies. Such supplies will require the seller 104 to tender payment, which is likely to reduce the seller's 104 cash flow and/or increase the seller's 104 debt. In another example, the invoice module 124 can access data associated with an estimate to determine what supplies the seller 104 needs to acquire before an upcoming service (and the date of such a service), which is likely to reduce the seller's 104 cash flow and/or increase the seller's 104 debt. In another example, the invoice module 124 can track the seller's 102 cash flow (e.g., via business banking services provided by the service provider and/or by monitoring an account balance associated with funds generated from payment processing performed by the service provider) and can determine that the seller's 102 cash flow falls below a threshold. The invoice module 124 can identify individual invoices that are likely to improve the operating condition of the seller 104 (e.g., increase cash flow) and the invoice module 124 can send a recommendation to the seller 104 to incentivize one or more buyers to pay outstanding invoices. In at least one example, the invoice module 124 can utilize a machine-learned model to determine which invoice(s) to incentivize, when to send an incentive, terms of an incentive, and the like. Additional details are provided below.

In at least one example, the invoice module 124 can send a recommendation to the seller computing device(s) 110 and the invoice user interface 114 can cause the GUI 700 to present a pop-up 702, overlay, or other user interface element to notify the seller 104 that the service provider recommends that the seller 104 incentivize one or more buyers, such as the buyer 102, to pay an outstanding invoice. In some examples, an incentive can modify a term of the outstanding invoice. For instance, the incentive can adjust a total cost of a transaction associated with an invoice. In additional or alternative examples, an incentive can provide a discount on a future item provided by the seller 104 or another, different seller associated with the service provider. In some examples, an incentive can be a loyalty benefit or other reward, or an avoidance of a penalty, such as a late fee or charge. In some examples, a term of the incentive (e.g., total invoice adjustment, amount of discount, reduction of fees, etc.) can be determined based at least in part on information associated with the buyer 102 to whom the incentive is targeted and/or information associated with the seller 104.

In at least one example, the seller 104 can interact with the GUI 700 to authorize an incentive and, responsive to receiving an indication that the seller 104 authorizes the incentive, the invoice module 124 can send an indication of the incentive to the buyer 102. That is, the invoice module 124 can send an indication of the incentive to the buyer computing device(s) 106, which can present an example GUI 704, as illustrated in FIG. 7B, to notify the buyer 102 that an incentive is available. Such a notification can be presented via the buyer user interface 108. In at least one example, responsive to the buyer 102 receiving the notification of the incentive, the buyer 102 can opt to tender payment for the outstanding invoice in order to claim the incentive. In at least one example, the invoice module 124 can determine whether the buyer 102 tenders payment for the invoice associated with the incentive and, if the buyer 102 tenders payment, the invoice module 124 can issue the incentive.

In some examples, the service provider can offer an incentive without obtaining authorization from the seller 104. That is, in some examples, the service provider can send a notification of an incentive to the buyer 102 and can fund at least a portion of expenses associated with the incentive. Furthermore, while FIGS. 7A and 7B describe incentives for outstanding invoices, in some examples, the service provider can offer the seller 104 the ability to incentivize on-time or early payment using incentives as described above.

While FIGS. 1-7 are described above with reference to tendering payment for a transaction 128, systems, methods, and techniques described above can be used to tender payment for a portion of the transaction 128. In at least one example, a portion of the transaction 128 can correspond to one or more items associated with the transaction. That is, systems, methods, and techniques described above can provide tender options for entire purchases or individual items associated with a purchase.

FIGS. 8-12 are flowcharts showing example methods involving techniques as described herein. The methods illustrated in FIGS. 8-12 are described with reference to FIG. 1 for convenience and ease of understanding. However, the methods illustrated in FIGS. 8-12 are not limited to being performed using components described in FIG. 1, and such components are not limited to performing the methods illustrated in FIGS. 8-12.

The methods 800-1200 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 800-1200 can be combined in whole or in part with each other or with other methods.

Figure 8:
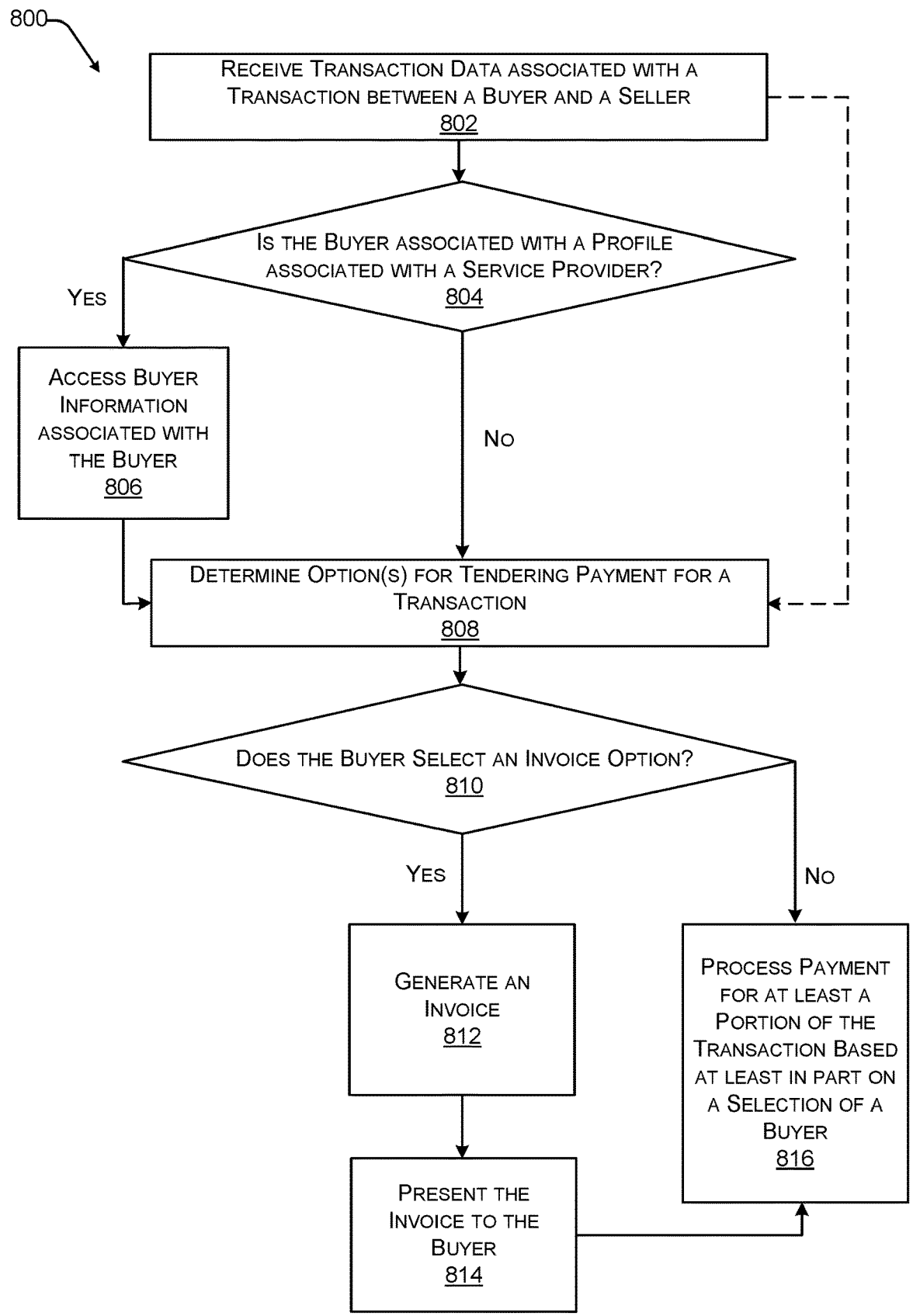
FIG. 8 illustrates an example process for determining option(s) for tendering payment for a transaction (or a portion thereof) and/or generating an invoice based at least in part on the option(s) as described herein.

FIG. 8 illustrates an example process 800 for determining option(s) for tendering payment for a transaction (or a portion thereof) and/or generating an invoice based at least in part on the option(s) as described herein.

Block 802 illustrates receiving transaction data associated with a transaction between a buyer and a seller. In at least one example, the buyer 102 can acquire one or more items from the seller 104 via a transaction. In some examples, the payment processing user interface 112 can provide transaction data associated with the transaction to the invoice module 124. As described above, transaction data can include, but is not limited to purchase amount information, point-of-purchase information (e.g., item(s) purchased, date of purchase, time of purchase, parties to the transaction, etc.), etc.

Block 804 illustrates determining whether the buyer is associated with a profile associated with a service provider. In at least one example, the transaction data can include information associated with the buyer 102. For instance, in at least one example, the buyer 102 can provide an email, phone number, or other identifier via the seller computing device(s) 110 (e.g., for loyalty rewards, a promotional offer, a receipt, etc.). Such information can be included with the transaction data and can be used by the invoice module 124 to determine whether the buyer 102 is associated with a profile (e.g., in the datastore 126). In another example, the buyer 102 can be associated with a buyer-facing application (e.g., on the buyer computing device(s) 108) which can be used to determine whether the buyer 102 is within a geofence associated with the seller 104 (e.g., the seller computing device(s) 110), for instance, at a physical location associated with a point-of-sale. In such an example, an identifier associated with the buyer 102 (e.g., which can be determined from the buyer-facing application) can be included with the transaction data and can be used by the invoice module 124 to determine whether the buyer 102 is associated with a profile (e.g., in the datastore 126). In at least one example, responsive to receiving an identifier associated with the buyer 102, the invoice module 124 can perform a lookup, or another search, to determine whether the datastore 126 is associated with a profile of the buyer 102.

Block 806 illustrates accessing buyer information associated with the buyer. As described above, buyer profiles can store, or otherwise be associated with, data associated with buyers. For instance, such buyer data can include, but is not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), loan information associated with the buyer (e.g., previous loans made to the buyer, previous defaults on said loans, etc.), risk information associated with the buyer (e.g., indications of risk, instances of fraud, chargebacks, etc.), appointments information (e.g., previous appointments, upcoming (scheduled) appointments, timing of appointments, lengths of appointments, etc.), payroll information (e.g., employers, payroll frequency, payroll amounts, etc.), reservations data (e.g., previous reservations, upcoming (scheduled) reservations, reservation duration, interactions associated with such reservations, etc.), buyer service information, etc. In at least one example, if the identifier associated with the buyer 102 corresponds to a buyer profile, the invoice module 124 can access buyer information associated with the buyer 102.

Block 808 illustrates determining option(s) for tendering payment for a transaction. As described above, in at least one example, the invoice module 124 can determine one or more tender options associated with the transaction. As described above, in at least one example, the invoice module 124 can underwrite the buyer 102, based at least in part on the information associated with the buyer 102, to determine tender options available for the buyer 102 for the transaction. In some examples, the combination of tender options can be based at least in part on services of the service provider used by the buyer 102. In some examples, the tender options can be determined based at least in part on information associated with the transaction and/or the seller 104.

In at least one example, the invoice module 124 can utilize one or more rules (e.g., provided by the service provider and/or seller 104) to determine the one or more tender options. In addition, or as an alternative, the invoice module 124 can utilize one or more machine-learned models to determine the one or more tender options. As described in more detail below, a machine-learning mechanism can analyze training data to train a data model that generates an output, which can be a recommendation, a score, and/or another indication, such as one or more tender options. For instance, a machine-learning mechanism can analyze buyer information, seller information, and/or transaction data associated with a plurality of transactions to train a model to recommend one or more tender options based on buyer information, seller information, and/or information associated with a new transaction. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.

In some examples, process 800 can omit operations described above with reference to blocks 804 and 806 and can proceed directly from block 802 to block 808.

In at least one example, tender options can be presented at a point-of-sale, for example, via the invoice user interface 114. Examples of tender options are described above with reference to FIGS. 3-5.

Block 810 illustrates determining whether the buyer selects an invoice option. In at least one example, one of the tender option(s) can correspond to an invoice option. In at least one example, if the buyer 102 selects an invoice tender option (e.g., via an interaction with a GUI presenting such invoice option(s)), the buyer 102 need not tender payment at the point-of-sale, and the payment processing user interface 112 can send an indication of such a selection to the invoice module 124.

Block 812 illustrates generating an invoice. In at least one example, responsive to the buyer 102 selecting an invoice option, the invoice module 124 can generate an invoice. In some examples, the payment processing user interface 112 can provide the transaction data associated with the transaction to the invoice module 124. As described above, the transaction data can include, but is not limited to purchase amount information, point-of-purchase information (e.g., item(s) purchased, date of purchase, time of purchase, parties to the transaction, etc.), etc. Furthermore, in at least one example, the invoice module 124 can access the tender option(s) associated with the transaction.

As described above with reference to FIG. 2, in at least one example, the datastore 126 can store templates of invoices. In at least one example, invoice template(s) can be mapped to, or otherwise associated with, seller profiles in the datastore 126. In some examples, the invoice module 124 can determine an identity of the seller 104 from the transaction data and/or an identifier associated with a device from which the transaction data was sent (e.g., the seller computing device(s) 110). The invoice module 124 can access the invoice template(s) that are mapped to, or otherwise associated with, a profile of the seller 104 based at least in part on the identity of the seller 104 and/or the identifier associated with the device from which the transaction data was sent.

In at least one example, the invoice module 124 can populate at least a portion of information associated with an invoice template based at least in part on the transaction data. Furthermore, in some examples, the invoice module 124 can add information associated with the buyer 102 to the invoice template. Moreover, based at least in part on determining tender option(s) for the transaction, the invoice module 124 can populate the tender option(s) of the invoice accordingly.

In at least one example, the invoice module 124 can associate a flag or other indicator with the transaction and/or invoice such that the invoice module 124 sends, or otherwise causes presentation of, the invoice to the buyer 102 at some time after the point-of-sale.

Block 814 illustrates presenting the invoice to the buyer. In at least one example, the invoice module 124 can cause an invoice to be presented via the buyer user interface 108. That is, the invoice module 124 can facilitate the transmission of the invoice to the buyer computing device(s) 106. In at least one example, the invoice module 124 can send the invoice as a text message, email, push notification, and/or an in-application notification at some time after the transaction at the point-of-sale. In at least one example, the invoice can be a digital invoice that enables the buyer 102 to pay for the associated transaction via an interaction with the digital invoice. As described above, in some examples, the invoice module 124 can cause an invoice to be presented via a user interface associated with the seller computing device(s) 110.

In some examples, the invoice can be associated with one or more tender options for tendering payment for at least a portion of the transaction. In at least one example, the tender option(s) presented via the invoice can be the same, or a subset of, the one or more tender option(s) presented at the point-of-sale. In some examples, the invoice can be associated with additional or alternative tender options, such as storing a payment instrument on-file (e.g., card-on-file) to tender payment for the invoice and/or future invoices, setting up recurring invoices, or the like. Furthermore, as described above, in at least one example, the tender option(s) presented in association with the invoice can be different than the tender option(s) presented at the point-of-sale based at least in part on changes associated with the buyer 102 and/or the seller 104 between the point-of-sale and the time of invoice.

Block 816 illustrates processing payment for at least a portion of the transaction based at least in part on a selection of the buyer. In at least one example, the invoice module 124 can receive an indication of a selection of a tender option either at the point-of-sale or via the invoice. The invoice module 124 can send the indication to the seller module 122 and the seller module 122 can process payment for at least a portion of a transaction based at least in part on the selection of the buyer 102. In at least one example, the seller module 122 can provide funds to the seller 104 for at least a portion of the transaction. That is, the seller module 122 can credit an account of the seller 104, which can be managed by the service provider, an amount based at least in part on at least the portion of the transaction (e.g., the transaction less fees associated with payment processing).

The seller module 122 can then access funds from the buyer 102 based at least in part on the tender option selected. For example, if the tender option selected corresponds to accessing funds associated with an account of the buyer 102 that is maintained by the service provider, the seller module 122 can withdraw an amount equal to at least the portion of the transaction from the account (and deposit the funds in an account of the service provider). Moreover, if the tender option selected corresponds with a loan (or other type of lending product) that is provided by the service provider, the service provider can issue the loan such that funds resulting from the loan are used to tender payment for the transaction. In such an example, the loan can enter repayment and the buyer 102 can repay the service provider per repayment terms of the loan.

In some examples, the invoice module 124 can generate an invoice without a buyer first selecting an invoice option, as illustrated in block 810. In such examples, the invoice can include one or more tender options as described above with reference to FIGS. 2-5.

Figure 9:
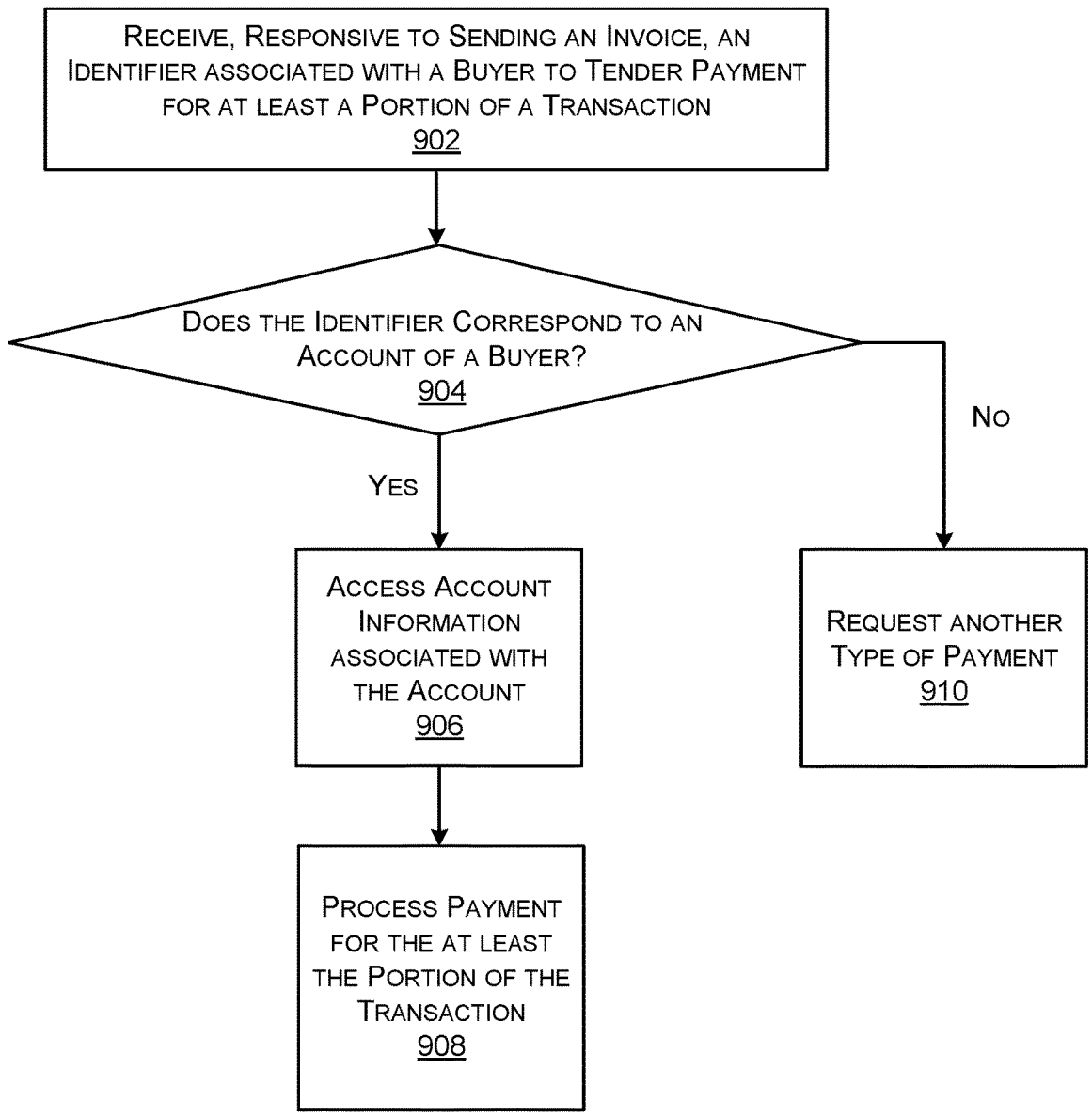
FIG. 9 illustrates an example process for processing payment for an invoice based at least in part on an identifier of a buyer as described herein.

FIG. 9 illustrates an example process 900 for processing payment for an invoice based at least in part on an identifier of a buyer as described herein.

Block 902 illustrates receiving, responsive to sending an invoice, an identifier associated with a buyer to tender payment for at least a portion of a transaction. As described above, in at least one example, the buyer 102 can be associated with an account having funds that have been generated based at least in part on peer-to-peer payment transactions. In at least one example, funds associated with the account can be used to tender payment for at least a portion of the transaction. In some examples, the account can be associated with an identifier, which, in some examples, is an alphanumeric identifier set by the buyer 102. In at least one example, accessing funds associated with the account can be a tender option presented in association with a transaction. In some examples, the buyer 102 can interact with the buyer user interface 108 to select such a tender option, at which point the buyer 102 can be prompted to provide the identifier. In other examples, the buyer 102 can send a communication (e.g., email, text message, etc.) including the identifier to the server computing device(s) 118 responsive to receiving the invoice (e.g., without selecting a tender option and/or providing the identifier responsive to a prompt to do so).

Block 904 illustrates determining whether the identifier corresponds to an account of a buyer. In at least one example, responsive to receiving the identifier associated with the buyer 102, the invoice module 124 can perform a lookup, or another search, to determine whether the identifier is associated with an account.

Block 906 illustrates accessing account information associated with the account. Based at least in part on determining that the identifier is associated with an account, the invoice module 124 can access account information associated with the account. In at least one example, such account information can be a form of payment data that can be used to access funds associated with the account. The invoice module 124 can provide the payment data to the seller module 122 for processing payment for at least a portion of the transaction.

Block 908 illustrates processing payment for at least the portion of the transaction. The seller module 122 can access funds from the account of the buyer 102 based at least in part on the tender option selected. For example, the seller module 122 can withdraw an amount equal to at least the portion of the transaction from the account and deposit the funds in an account of the service provider. In at least one example, the seller module 122 can provide funds to the seller 104 for at least a portion of the transaction. That is, the seller module 122 can credit an account of the seller 104, which can be managed by the service provider, an amount based at least in part on a cost of at least the portion of the transaction (e.g., the transaction less fees associated with payment processing). In some examples, the seller module 122 can credit the account of the seller 104 prior to withdrawing the funds from the account of the buyer 102.

Block 910 illustrates requesting another type of payment. In at least one example, if the identifier is not associated with an account and/or the invoice module 124 cannot identify the account based on the identifier, the invoice module 124 can prompt the buyer 102 to select another tender option.

Figure 10:
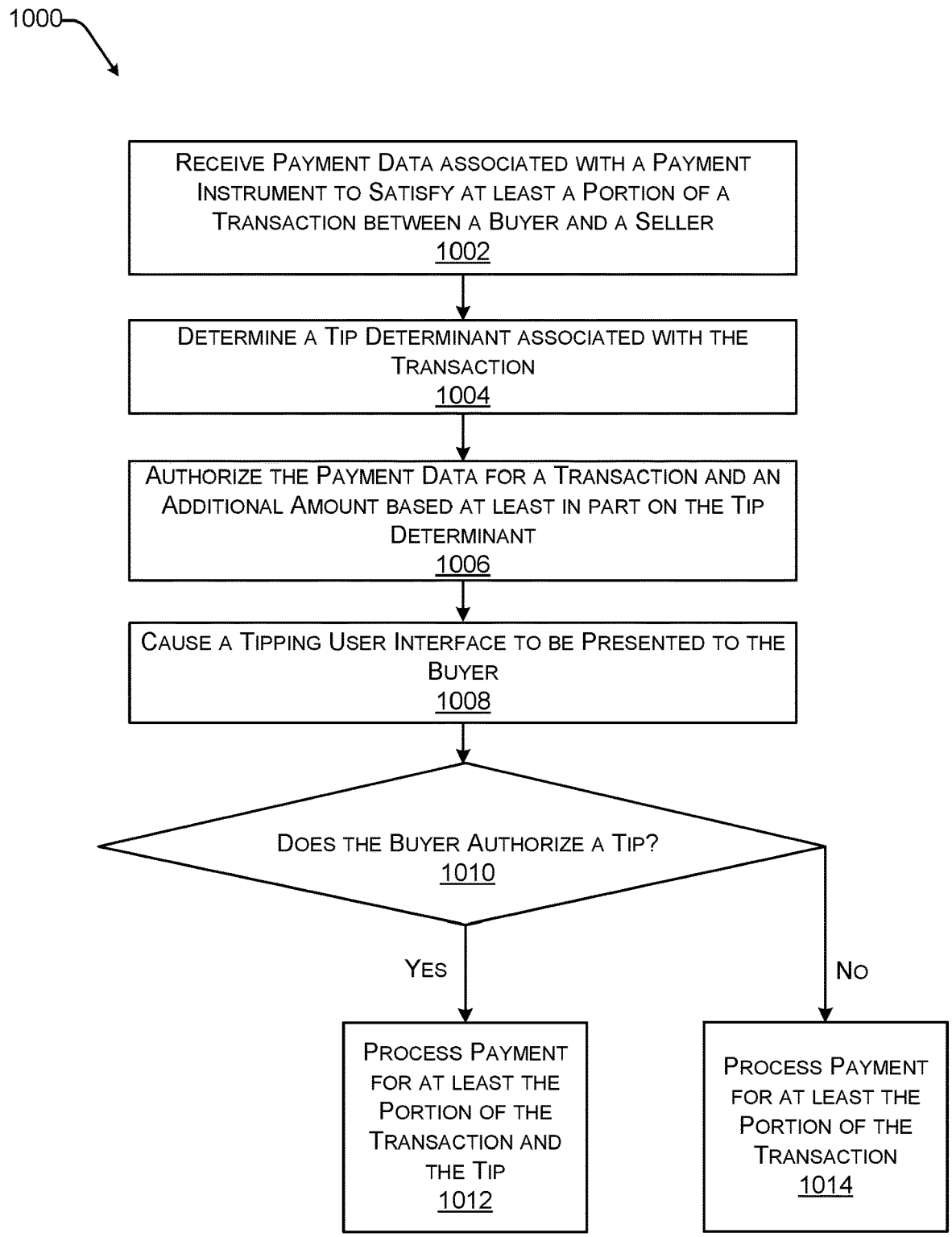
FIG. 10 illustrates an example process for tipping via an invoice as described herein.

FIG. 10 illustrates an example process 1000 for tipping via an invoice as described herein.

Block 1002 illustrates receiving payment data associated a payment instrument to satisfy at least a portion of a transaction between a buyer and a seller. In at least one example, a buyer 102 can provide payment data associated with a payment instrument for tendering payment for at least a portion of a transaction. In some examples, such payment data can be provided in association with an invoice received via buyer computing device(s) 106 and presented via the buyer user interface 108.

In at least one example, the invoice can be associated with an item where tipping is appropriate. However, in some examples, the buyer 102 may not be prepared to tip at the point-of-sale or at the time they tender payment in association with the invoice (e.g., the seller 104 has not yet performed the service or delivered the item to the buyer 102). That is, in some examples, the buyer 102 can tender payment for an invoice at a different time than when the item(s) associated with the transaction are provided to the buyer 102 (e.g., the time of service is different from the time of payment).

Block 1004 illustrates determining a tip determinant associated with the transaction. In at least one example, the invoice module 124 can determine a tip determinant associated with the transaction. The tip determinant can be determined based at least in part on information associated with the buyer 102, the seller 104, and/or the transaction. In at least one example, the invoice module 124 can utilize one or more machine-learned models to determine the tip determinant associated with the transaction. As described in more detail below, a machine-learning mechanism can analyze training data to train a data model that generates an output, which can be a recommendation, a score, and/or another indication, such as a tip determinant. For instance, a machine-learning mechanism can analyze buyer information, seller information, and/or invoices associated with a plurality of transactions to train a model to recommend a tip determinant based on buyer information, seller information, and/or information associated with a new invoice associated with a new transaction. In at least one example, the invoice module 124 can provide the tip determinant to the seller module 122.

Block 1006 illustrates authorizing the payment data for a transaction and an additional amount based at least in part on the tip determinant. In at least one example, the seller module 122 can send an authorization request to payment service server computing device(s) to authorize the payment data for the transaction and an additional amount based at least in part on the tip determinant. That is, the seller module 122 can send an authorization request to payment service server computing device(s) to determine whether the payment data is authorized for the transaction and an additional amount. In some examples, the additional amount can be the high-end of a range associated with the tip determinant (e.g., the largest amount of tip associated with the tip determinant). In other examples, the additional amount can be based at least in part on an amount determined based on historical data associated with the buyer 102 and/or other buyers similar to the buyer 102.

Block 1008 illustrates causing a tipping user interface to be presented to the buyer. In at least one example, the invoice module 124 can provide a tipping GUI, such as the tipping GUI 602 described above with reference to FIG. 6, at some time after an item is provided to the buyer 102 to provide the buyer 102 with an opportunity to add a tip (e.g., in addition to the transaction). In at least one example, the tipping GUI can present one or more suggested tips, which can be based at least in part on the tip determinant. In some examples, such suggested tips can be discrete amounts (e.g., dollars) or percentages of the transaction. In some examples, the buyer 102 can specify a tip, which may or may not be within the tip determinant.

In at least one example, the invoice associated with the transaction can be associated with an open state until a time period during which the buyer 102 can tip lapses and/or until a tip is added to the invoice. In some examples, the time period can be specified by the seller 104 and/or the service provider.

Block 1010 illustrates determining whether the buyer authorizes a tip. In at least one example, the invoice module 124 can receive an indication that the buyer 102 authorizes a tip and an amount of the tip. Based at least in part on receiving such an indication, the invoice module 124 can send the indication to the seller module 122 and the seller module 122 can process payment for at least a portion of the transaction and the tip, as illustrated in block 1012. That is, the seller module 122 can send a capture request to payment service server computing device(s) and settle the transaction based at least in part on sending the capture request to the payment service server computing device(s) (and the response therefrom).

Block 1014 illustrates processing payment for at least the portion of the transaction. If the buyer 102 does not authorize a tip while the invoice is associated with the open state, the seller module 122 can process payment for at least a portion of the transaction without a tip. That is, the seller module 122 can send a capture request to payment service server computing device(s) and settle the transaction based at least in part on sending the capture request to the payment service server computing device(s) (and the response therefrom).

Figure 11:
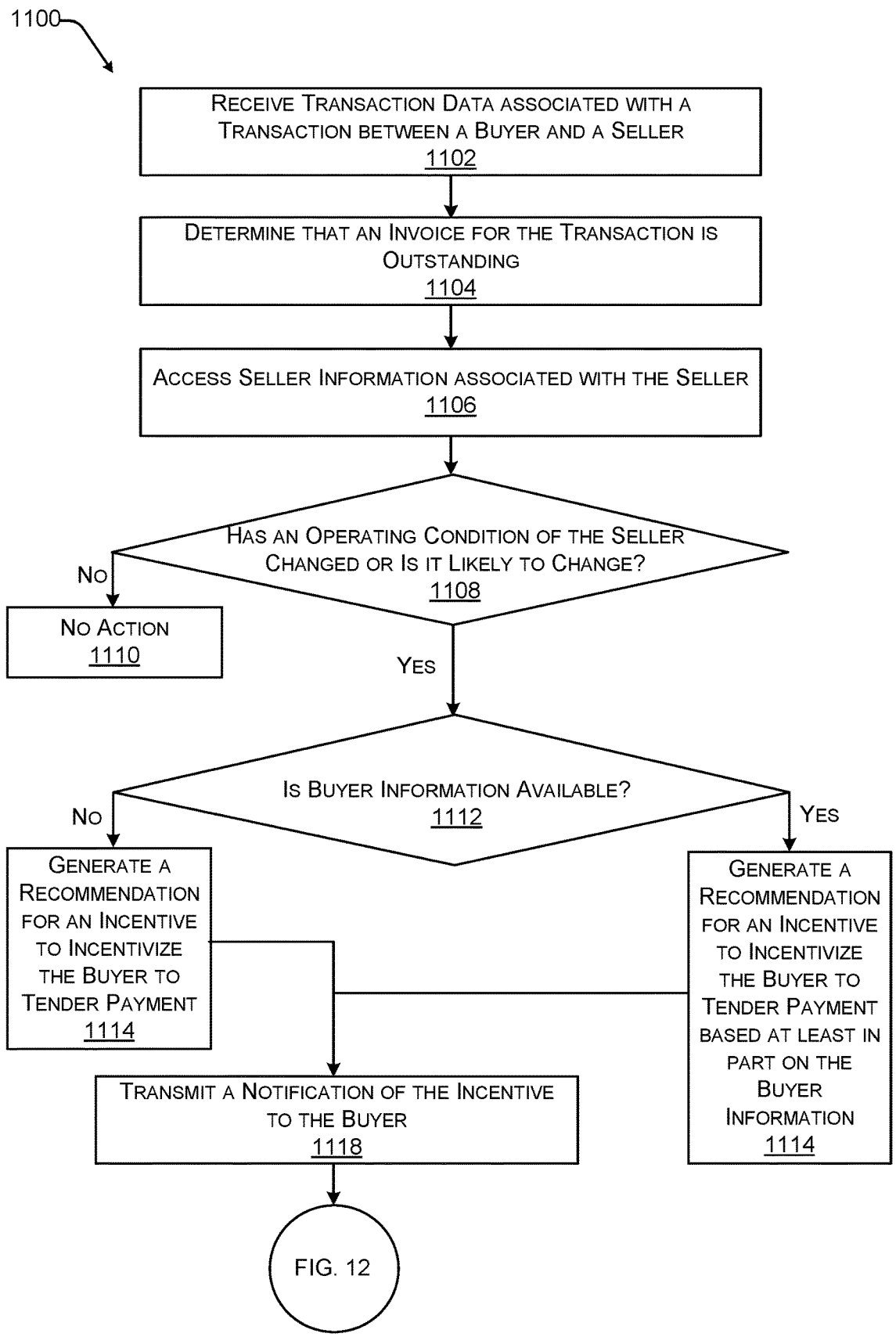
FIG. 11 illustrates an example process for generating and/or transmitting an incentive to a buyer to incentivize the buyer to tender payment for an invoice as described herein.

FIG. 11 illustrates an example process 1100 for generating and/or transmitting an incentive to a buyer to incentivize the buyer to tender payment for an invoice as described herein.

Block 1102 illustrates receiving transaction data associated with a transaction between a buyer and a seller. In at least one example, the buyer 102 can acquire one or more items from the seller 104 via a transaction. In some examples, the payment processing user interface 112 can provide transaction data associated with the transaction to the invoice module 124. As described above, transaction data can include, but is not limited to purchase amount information, point-of-purchase information (e.g., item(s) purchased, date of purchase, time of purchase, parties to the transaction, etc.), etc.

Block 1104 illustrates determining that an invoice for the transaction is outstanding. In at least one example, the invoice module 124 can generate an invoice for the transaction. In at least one example, the seller 104 can interact with the invoice user interface 114 to generate an invoice. In some examples, receipt of the transaction data can initiate invoice generation. In other examples, invoice generation can be initiated responsive to a selection of an invoice tender option at a point-of-sale associated with the transaction, as described above. The invoice module 124 can generate an invoice based at least in part on the transaction data, as described above with reference to block 812 of FIG. 8. In at least one example, the buyer 102 may not tender payment for the transaction and thus, the corresponding invoice can be determined to be outstanding.

Block 1106 illustrates accessing seller information associated with the seller. In some examples, the invoice module 124 can determine an identity of the seller 104 from the transaction data and/or an identifier associated with a device from which the transaction data was sent (e.g., the seller computing device(s) 110). The invoice module 124 can perform a look-up, or another search, to access a seller profile associated with the seller 104. As described above, seller profiles can store, or otherwise be associated with, data associated with sellers. For instance, a seller profile can store, or otherwise be associated with, information about a seller (e.g., name of the seller, geographic location of the seller, operating hours of the seller, employee information, etc.), a seller category classification (MCC), item(s) offered for sale by the seller, hardware (e.g., device type) used by the seller, transaction data associated with the seller (e.g., transactions conducted by the seller, payment data associated with the transactions, items associated with the transactions, descriptions of items associated with the transactions, itemized and/or total spends of each of the transactions, parties to the transactions, dates, times, and/or locations associated with the transactions, etc.), invoice information associated with the seller (e.g., invoices sent, paid, incentives associated therewith, etc.), estimate information associated with the seller (e.g., estimates sent, estimates converted into invoices, etc.), loan information associated with the seller (e.g., previous loans made to the seller, previous defaults on said loans, etc.), risk information associated with the seller (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations information (e.g., previous reservations, upcoming (scheduled) reservations, interactions associated with such reservations, etc.), inventory information, buyer service information, etc. The seller profile can securely store bank account information as provided by the seller. Further, the seller profile can store payment information associated with a payment instrument linked to an account of the seller that is maintained by the service provider.

Block 1108 illustrates determining whether an operating condition of the seller changed or is likely to change. In at least one example, the invoice module 124 can track operating conditions of sellers based at least in part on information associated with seller profiles. That is, in some examples, the invoice module 124 can access information associated with the seller 104 to track and/or otherwise monitor changes to operating conditions of the seller 104. In at least one example, such operating conditions can include cash flow, debt, accounts receivable, etc. In at least one example, the invoice module 124 can access appointments data (e.g., indicative of appointments scheduled or managed by the service provider), estimates data (e.g., indicative of estimates for seller services (or goods) that are scheduled to be provided or have been provided), payment processing data (e.g., indicative of transactions processed on behalf of the seller 104 by the service provider), business banking data (e.g., indicative of business banking transactions of the seller 104), and the like to determine whether an operating condition of the seller 104 has changed or is likely to change. That is, the invoice module 124 can leverage seller information associated with a seller profile, which can be indicative of interactions between the seller 104 and the service provider, to determine whether an operating condition has changed or is likely to change.

In some examples, the invoice module 124 can utilize one or more rules (e.g., provided by the service provider) to determine whether an operating condition of the seller 104 has changed or is likely to change. In some examples, the invoice module 124 can utilize statistical analyses to determine whether an operating condition of the seller 104 has changed or is likely to change. In some examples, the invoice module 124 can utilize a machine-trained model that can analyze information associated with the seller 104 to determine whether an operating condition of the seller 104 has changed or is likely to change. As described in more detail below, a machine-learning mechanism can analyze training data to train a data model that generates an output, which can be a recommendation, a score, and/or another indication, such as whether an operating condition of a seller is likely to change or has changed. For instance, a machine-learning mechanism can analyze seller information to train a model to output an indication of a likelihood that an operating condition of a seller is going to change and/or has changed.

If the invoice module 124 determines that an operating condition of the seller 104 has not changed and/or is not likely to change, the invoice module 124 can refrain from taking any action, as illustrated in block 1110.

Block 1112 illustrates determining whether buyer information is available. In at least one example, the transaction data can include information associated with the buyer 102. For instance, in at least one example, the buyer 102 can provide an email, phone number, or other identifier via the seller computing device(s) 110 (e.g., for loyalty rewards, a promotional offer, a receipt, etc.). Such information can be included with the transaction data and can be used by the invoice module 124 to determine whether the buyer 102 is associated with a profile (e.g., in the datastore 126). In another example, the buyer 102 can be associated with a buyer-facing application (e.g., on the buyer computing device(s) 106) which can be used to determine whether the buyer 102 is within a geofence associated with the seller 104 (e.g., the seller computing device(s) 110), for instance, at a physical location associated with a point-of-sale. In such an example, an identifier associated with the buyer 102 (e.g., which can be determined from the buyer-facing application) can be included with the transaction data and can be used by the invoice module 124 to determine whether the buyer 102 is associated with a profile (e.g., in the datastore 126). In at least one example, responsive to receiving an identifier associated with the buyer 102, the invoice module 124 can perform a lookup, or another search, to determine whether the datastore 126 is associated with a profile of the buyer 102.

In at least one example, if buyer information associated with the buyer 102 is not available (e.g., via the profile of the buyer 102), the invoice module 124 can nevertheless generate a recommendation for an incentive to incentivize the buyer 102 to tender payment for the invoice, as illustrated in block 1114. In at least one example, based at least in part on determining that an operating condition of the seller 104 changed or is likely to change, the invoice module 124 can generate a recommendation for an incentive to incentivize the buyer 102 to tender payment for the invoice. In some examples, an incentive can modify a term of the outstanding invoice. For instance, the incentive can reduce a total cost of a transaction associated with an invoice. In additional or alternative examples, an incentive can provide a discount on a future item provided by the seller 104 or another, different seller associated with the service provider. In some examples, an incentive can be a loyalty benefit or other reward, or an avoidance of a penalty, such as a late fee or charge.

In some examples, the recommendation can be a recommendation to incentivize more than one buyer. In at least one example, the invoice module 124 can analyze invoices to determine which invoice(s), if paid, can mitigate and/or offset the change in the operating condition of the seller 104. In some examples, the determination of whether to recommend an incentive and/or what incentive to recommend can depend on information associated with the buyer(s), seller 104, and/or invoice. For instance, in at least one example, an incentive can be recommended for an invoice based on an amount of the invoice, a period of time that the invoice has been outstanding (e.g., lateness of payment), item(s) associated with the invoice, etc.

In at least one example, if buyer information associated with the buyer 102 is available (e.g., via the profile of the buyer 102), the invoice module 124 can generate a recommendation for an incentive to incentivize the buyer 102 to tender payment based at least in part on the buyer information, as illustrated in block 1116. That is, in some examples, the recommendation can be a recommendation to incentivize a particular buyer. In some examples, a term of the incentive (e.g., total invoice adjustment, amount of discount, reduction of fees, etc.) can be determined based at least in part on information associated with the buyer 102 to whom the incentive is targeted and/or information associated with the seller 104.

Block 1118 illustrates transmitting a notification of the incentive to the buyer. In at least one example, the invoice module 124 can send, or otherwise facilitate the transmission of, a recommendation to the seller computing device(s) 110, recommending that the seller 104 incentivize the buyer 102 to tender payment for the invoice. In at least one example, the invoice module 124 can send the recommendation as a text message, email, push notification, and/or an in-application notification.

Figure 12:
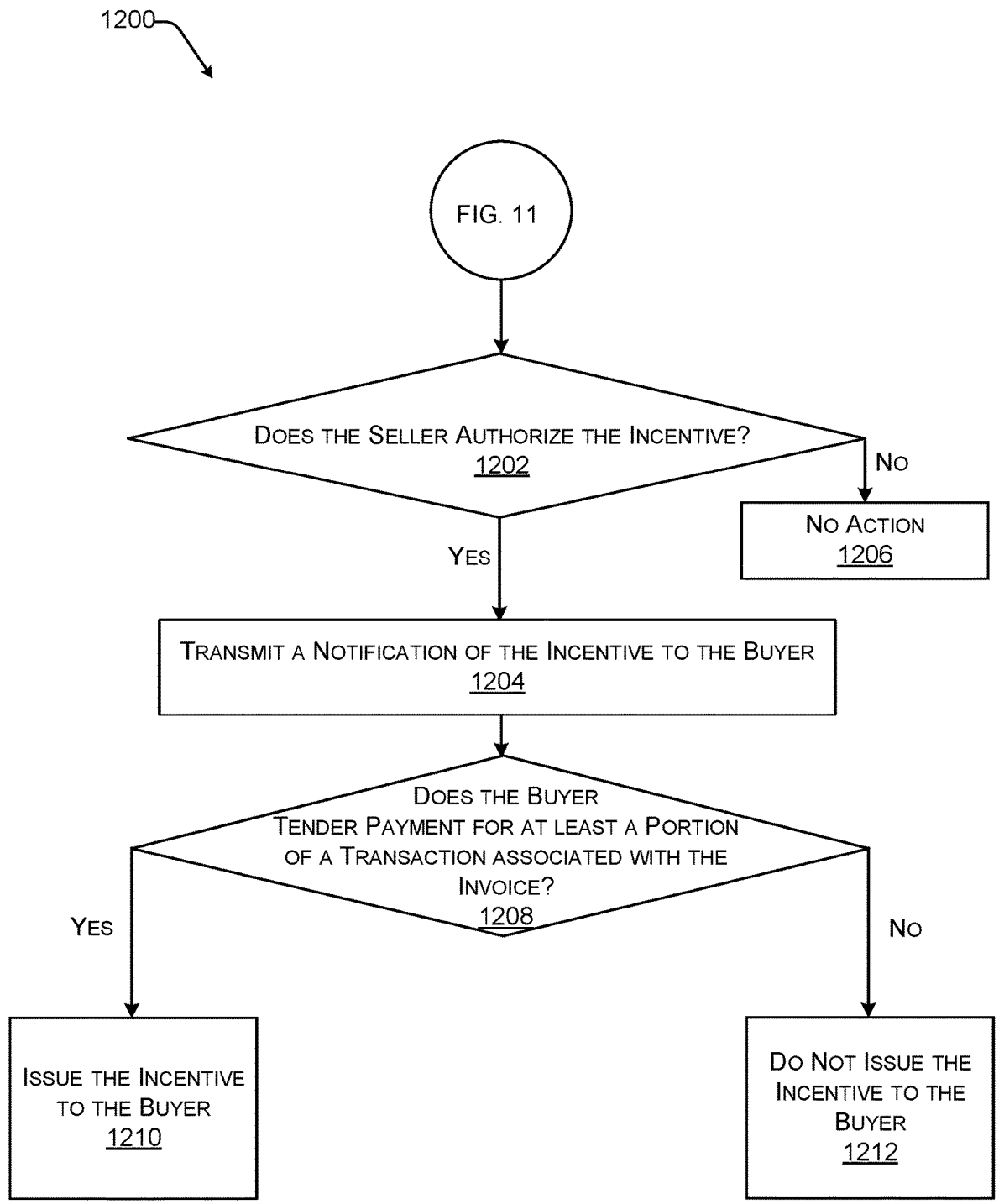
FIG. 12 illustrates an example process for issuing an incentive to a buyer based at least in part on the buyer tendering payment for an invoice as described herein.

FIG. 12 illustrates an example process 1200 for issuing an incentive to a buyer based at least in part on the buyer tendering payment for an invoice as described herein.

Block 1202 illustrates determining whether the seller authorizes the incentive. In at least one example, the invoice module 124 can send, or otherwise facilitate the transmission of, a recommendation to the seller computing device(s) 110, as described above with reference to block 1118 of FIG. 11. The invoice user interface 114 can cause a GUI, such as the GUI 700 described above with reference to FIG. 7, to present a pop-up, overlay, or other user interface element to notify the seller 104 that the service provider recommends that the seller 104 incentivize one or more buyers, such as the buyer 102, to pay an outstanding invoice. In at least one example, the seller 104 can interact with the GUI to authorize an incentive and, responsive to receiving an indication that the seller 104 authorizes the incentive, the invoice module 124 can send an indication of the incentive to the buyer 102, as illustrated in block 1204. If the seller 104 does not authorize the incentive, the invoice module 124 can refrain from taking an action, as illustrated in block 1206.

Block 1208 illustrates determining whether the buyer tenders payment for at least a portion of the transaction associated with the invoice. In at least one example, the invoice module 124 can send an indication of the incentive to the buyer computing device(s) 106, which can present a GUI, such as the GUI 704 illustrated in FIG. 7B above, to notify the buyer 102 that an incentive is available. Such a notification can be presented via the buyer user interface 108. In at least one example, responsive to the buyer 102 receiving the notification of the incentive, the buyer 102 can opt to tender payment for at least a portion of the transaction associated with the outstanding invoice. In at least one example, the invoice module 124 can determine whether the buyer 102 tenders payment for at least a portion of the transaction associated with the outstanding invoice that is associated with the incentive and, if the buyer 102 tenders payment, the invoice module 124 can issue the incentive (or otherwise cause the incentive to be issued), as illustrated in block 1210. That is, if the buyer 102 tenders payment, the invoice module 124 can send an indication of such to the seller 104 and the seller 104 can apply a discount to the transaction, send an offer for a discount on a future transaction, waive penalty fees, etc. If the buyer 102 does not tender payment for at least a portion of the transaction associated with the outstanding invoice that is associated with the incentive, the invoice module 124 can refrain from issuing the incentive to the buyer 102, as illustrated in block 1212.

While FIGS. 12A and 12B describe incentives for outstanding invoices, in some examples, the service provider can offer the seller 104 the ability to incentivize on-time or early payment using incentives as described above.

Figure 13:
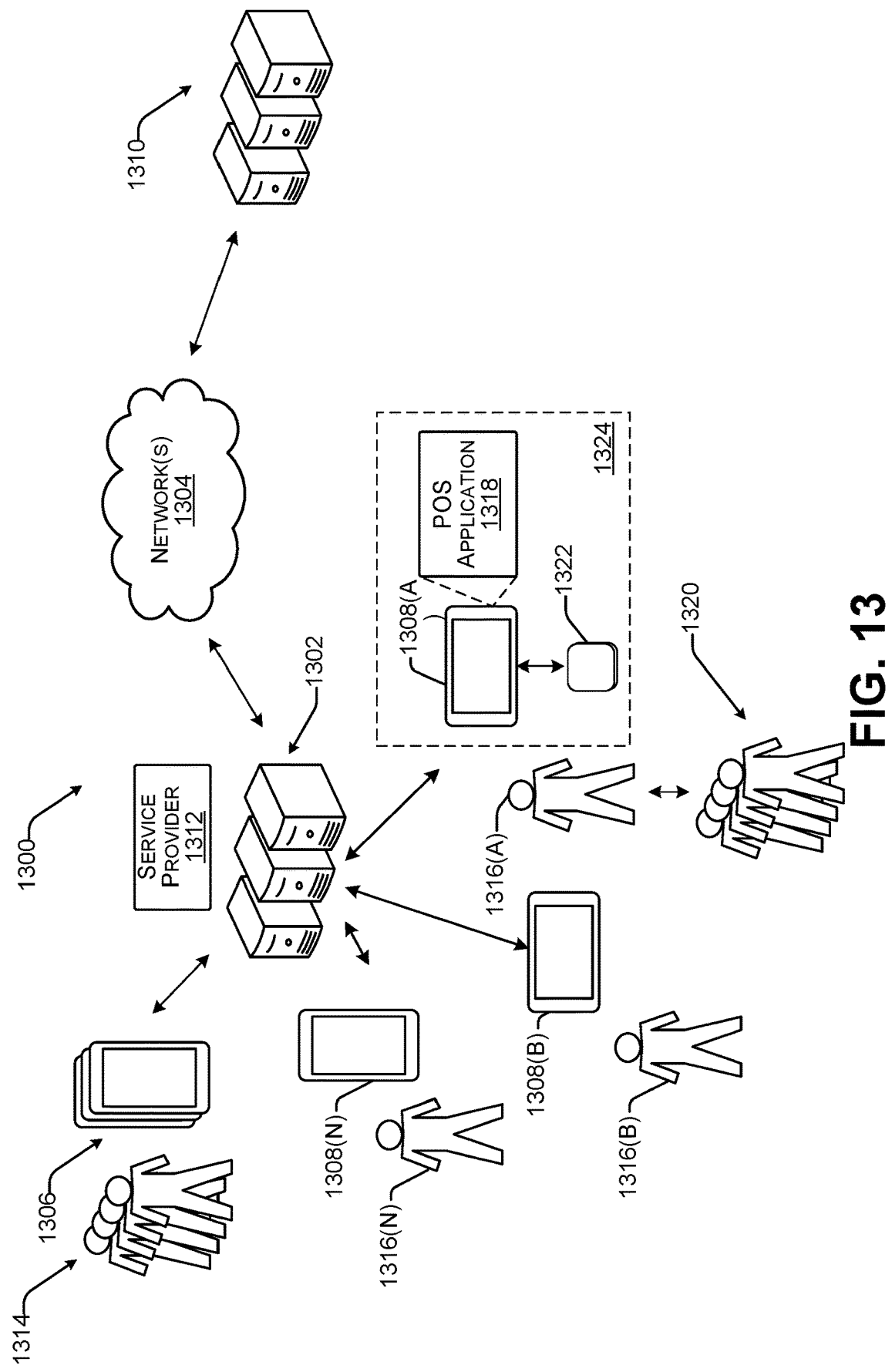
FIG. 13 illustrates an example seller ecosystem for facilitating, among other things, techniques described herein.

FIG. 13 illustrates an example environment 1300. The environment 1300 includes server computing device(s) 1302 that can communicate over a network 1304 with user devices 1306 (which, in some examples can be seller devices 1308 (individually, 1308(A)-1308(N))) and/or server computing device(s) 1310 associated with third-party service provider(s). The server computing device(s) 1302 can be associated with a service provider 1312 that can provide one or more services for the benefit of users 1314, as described below. Actions attributed to the service provider 1312 can be performed by the server computing device(s) 1302.

As described above, the environment 1300 can facilitate intelligently generating and/or managing invoices. In an example, the service provider 1312 can underwrite a buyer at a point-of-sale so that the service provider 1312 can determine whether the buyer can opt to tender payment for a cost of an entire purchase from a seller or individual items associated with the purchase via an invoice. In some examples, such underwriting can additionally or alternatively be based on information associated with the seller and/or the item(s). Furthermore, in some examples, the service provider 1312 can intelligently determine personalized or customized options for enabling the buyer to tender payment for the cost of the entire purchase or individual items associated with the purchase, for example, using other services provided by the service provider 1312 (e.g., an account storing funds received via a peer-to-peer payment service availed by the service provider 1312, a loan offered by the service provider 1312, etc.). In at least one example, techniques described herein can facilitate the management of invoices, for example, by enabling sellers to track payment (or lack thereof) of invoices. In some examples, the service provider 1312 can offer a seller the ability to incentivize payment for an invoice based on changed circumstances of the seller (e.g., reduced cash flow, unforeseen bill payment, etc.) and/or information associated with the invoice. In some examples, such an incentive can modify terms of the invoice (e.g., reduce the total cost) and/or offer a discount for a future transaction (e.g., with the seller or another seller associated with the service provider 1312).

In at least one example, the service provider 1312 can offer payment processing services whereby the service provider 1312 processes transactions for sellers associated with the service provider 1312. The service provider 1312 can additionally provide other services including, but not limited to, inventory management services, catalog management services, business banking services, financing services, lending services, reservation management services, estimating services, invoice services, web-development services, payroll services, employee management services, appointment services, loyalty tracking services, restaurant management services, order management services, fulfillment services, peer-to-peer payment services, onboarding services, identity verification (IDV) services, and so on. Additional details associated with such services are described below. In some examples, the service provider 1312 can track which services are used by individual buyers and/or sellers. In at least one example, the service provider 1312 can leverage information associated with buyers and/or sellers that utilize the services availed by the service provider 1312 to intelligently underwrite transactions to determine terms associated with invoices for such transactions, as described herein. For example, service usage by buyers and/or sellers can inform tender options as described herein. Furthermore, in some examples, service usage can inform incentives used for incentivizing payment for invoices as described herein.

Aspects of the environment 1300 are described above with reference to FIG. 1. In at least one example, the server computing device(s) 1302 can correspond to the server computing device(s) 118 described above with reference to FIG. 1. Furthermore, the user device(s) 1306 can correspond to the seller computing device(s) 110 and/or the buyer computing device(s) 106 described above with reference to FIG. 1, and the seller 104 and/or the buyer 102 described above with reference to FIG. 1 are examples of the users 1314. In at least one example, the network(s) 1304 can correspond to the network(s) 120 described above with reference to FIG. 1.

In at least one example, the environment 1300 can include a plurality of user devices 1306, as described above. Each one of the plurality of user devices 1306 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1314. The users 1314 can be referred to as buyers, customers, sellers, merchants, borrowers, employees, employers, payors, payees, couriers and so on. The users 1314 can interact with the user devices 1306 via user interfaces presented via the user devices 1306. In at least one example, a user interface can be presented via a web browser, or the like. In other examples, a user interface can be presented via an application, such as a mobile application or desktop application, which can be provided by the service provider 1312 or which can be an otherwise dedicated application. In some examples, individual of the user devices 1306 can have an instance or versioned instance of an application, which can be downloaded from an application store, for example, which can present the user interface(s) described herein. In at least one example, a user 1314 can interact with the user interface via touch input, spoken input, or any other type of input.

As described above, in at least one example, the users 1314 can include sellers 1316 (individually, 1316(A)-1316 (N)). In an example, the sellers 1316 can operate respective seller devices 1308, which can be user devices 1306 configured for use by sellers 1316. For the purpose of this discussion, a "seller" can be any entity that offers items (e.g., goods or services) for purchase or other means of acquisition (e.g., rent, borrow, barter, etc.). The sellers 1316 can offer items for purchase or other means of acquisition via brick-and-mortar stores, mobile stores (e.g., pop-up shops, food trucks, etc.), online stores, combinations of the foregoing, and so forth. In some examples, at least some of the sellers 1316 can be associated with a same entity but can have different seller locations and/or can have franchise/franchisee relationships. In additional or alternative examples, the sellers 1316 can be different sellers. That is, in at least one example, the seller 1316(A) is a different seller than the seller 1316(B) and/or the seller 1316(C).

For the purpose of this discussion, "different sellers" can refer to two or more unrelated sellers. "Different sellers" therefore can refer to two or more sellers that are different legal entities (e.g., natural persons and/or corporate persons) that do not share accounting, employees, branding, etc. "Different sellers," as used herein, have different names, employer identification numbers (EINs), lines of business (in some examples), inventories (or at least portions thereof), and/or the like. Thus, the use of the term "different sellers" does not refer to a seller with various seller locations or franchise/franchisee relationships. Such sellers—with various seller locations or franchise/franchisee relationships—can be referred to as sellers having different seller locations and/or different commerce channels.

Each seller device 1308 can have an instance of a POS application 1318 stored thereon. The POS application 1318 can configure the seller device 1308 as a POS terminal, which enables the seller 1316(A) to interact with one or more buyers 1320. As described above, the users 1314 can include buyers, such as the buyers 1320 shown as interacting with the seller 1316(A). For the purpose of this discussion, a "buyer" can be any entity that acquires items from sellers. While only two buyers 1320 are illustrated in FIG. 13, any number of buyers 1320 can interact with the sellers 1316. Further, while FIG. 13 illustrates the buyers 1320 interacting with the seller 1316(A), the buyers 1320 can interact with any of the sellers 1316.

In at least one example, interactions between the buyers 1320 and the sellers 1316 that involve the exchange of funds (from the buyers 1320) for items (from the sellers 1316) can be referred to as "POS transactions" and/or "transactions." In at least one example, the POS application 1318 can determine transaction data associated with the POS transactions. Transaction data can include payment information, which can be obtained from a reader device 1322 associated with the seller device 1308(A), user authentication data, purchase amount information, point-of-purchase information (e.g., item(s) purchased, date of purchase, time of purchase, etc.), etc. The POS application 1318 can send transaction data to the server computing device(s) 1302. Furthermore, the POS application 1318 can present a UI to enable the seller 1316(A) to interact with the POS application 1318 and/or the service provider 1312 via the POS application 1318.

In at least one example, the seller device 1308(A) can be a special-purpose computing device configured as a POS terminal (via the execution of the POS application 1318). In at least one example, the POS terminal may be connected to a reader device 1322, which is capable of accepting a variety of payment instruments, such as credit cards, debit cards, gift cards, short-range communication based payment instruments, and the like, as described below. In at least one example, the reader device 1322 can plug in to a port in the seller device 1308(A), such as a microphone port, a headphone port, an audio-jack, a data port, or other suitable port. In additional or alternative examples, the reader device 1322 can be coupled to the seller device 1308(A) via another wired or wireless connection, such as via a Bluetooth®, BLE, and so on. Additional details are described below with reference to FIG. 14. In some examples, the reader device 1322 can read information from alternative payment instruments including, but not limited to, wristbands and the like.

In some examples, the reader device 1322 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1322, and communicate with the server computing device(s) 1302, which can provide, among other services, a payment processing service. The server computing device(s) 1302 associated with the service provider 1312 can communicate with server computing device(s) 1310, as described below. In this manner, the POS terminal and reader device 1322 may collectively process transaction(s) between the sellers 1316 and buyers 1320. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1322 of the POS system 1324 are shown as separate devices, in additional or alternative examples, the POS terminal and the reader device 1322 can be part of a single device. In some examples, the reader device 1322 can have a display integrated therein for presenting information to the buyers 1320. In additional or alternative examples, the POS terminal can have a display integrated therein for presenting information to the buyers 1320. POS systems, such as the POS system 1324, may be mobile, such that POS terminals and reader devices may process transactions in disparate locations across the world. POS systems can be used for processing card-present transactions and card-not-present (CNP) transactions, as described below.

A card-present transaction is a transaction where both a buyer 1320 and his or her payment instrument are physically present at the time of the transaction. Card-present transactions may be processed by swipes, dips, taps, or any other interaction between a physical payment instrument (e.g., a card), or otherwise present payment instrument, and a reader device 1322 whereby the reader device 1322 is able to obtain payment data from the payment instrument. A swipe is a card-present transaction where a buyer 1320 slides a card, or other payment instrument, having a magnetic strip through a reader device 1322 that captures payment data contained in the magnetic strip. A dip is a card-present transaction where a buyer 1320 inserts a payment instrument having an embedded microchip (i.e., chip) into a reader device 1322 first. The dipped payment instrument remains in the payment reader until the reader device 1322 prompts the buyer 1320 to remove the card, or other payment instrument. While the payment instrument is in the reader device 1322, the microchip can create a one-time code which is sent from the POS system 1324 to the server computing device(s) 1310 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a buyer 1320 may tap or hover his or her payment instrument (e.g., card, electronic device such as a smart phone running a payment application, etc.) over a reader device 1322 to complete a transaction via short-range communication (e.g., NFC, RFID, Bluetooth®, BLE, etc.). Short-range communication enables the payment instrument to exchange information with the reader device 1322. A tap may also be called a contactless payment.

A CNP transaction is a transaction where a card, or other payment instrument, is not physically present at the POS such that payment data is required to be manually keyed in (e.g., by a seller, buyer, etc.), or payment data is required to be recalled from a card-on-file data store, to complete the transaction.

The POS system 1324, the server computing device(s) 1302, and/or the server computing device(s) 1310 may exchange payment information and transaction data to determine whether transactions are authorized. For example, the POS system 1324 may provide encrypted payment data, user authentication data, purchase amount information, point-of-purchase information, etc. (collectively, transaction data) to server computing device(s) 1302 over the network(s) 1304. The server computing device(s) 1302 may send the transaction data to the server computing device(s) 1310. As described above, in at least one example, the server computing device(s) 1310 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of sellers(s). An acquirer can be a registered member of a card association (e.g., Visa®, MasterCard®), and can be part of a card payment network. The acquirer (e.g., the server computing device(s) 1310 associated therewith) can send a fund transfer request to a server computing device of a card payment network (e.g., Mastercard®, VISA®, etc.) to determine whether the transaction is authorized or deficient. In at least one example, the service provider 1312 can serve as an acquirer and connect directly with the card payment network.

The card payment network (e.g., the server computing device(s) 1310 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1310 associated therewith) can make a determination as to whether the buyer has the capacity to absorb the relevant charge associated with the payment transaction. In at least one example, the service provider 1312 can serve as an issuer and/or can partner with an issuer. The transaction is either approved or rejected by the issuer and/or the card payment network (e.g., the server computing device(s) 1310 associated therewith), and a payment authorization message is communicated from the issuer to the POS device via a path opposite of that described above, or via an alternate path.

As described above, the server computing device(s) 1310, which can be associated with payment service provider(s), may determine whether the transaction is authorized based on the transaction data, as well as information relating to parties to the transaction (e.g., the buyer 1320 and/or the seller 1316(A)). The server computing device(s) 1310 may send an authorization notification over the network(s) 1304 to the server computing device(s) 1302, which may send the authorization notification to the POS system 1324 over the network(s) 1304 to indicate whether the transaction is authorized. The server computing device(s) 1302 may also transmit additional information such as transaction identifiers to the POS system 1324. In one example, the server computing device(s) 1302 may include a seller application and/or other functional components for communicating with the POS system 1324 and/or the server computing device(s) 1310 to authorize or decline transactions.

Based on the authentication notification that is received by the POS system 1324 from server computing device(s) 1302, the seller 1316(A) may indicate to the buyer 1320 whether the transaction has been approved. In some examples, approval may be indicated at the POS system 1324, for example, at a display of the POS system 1324. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1312 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1314 can access all of the services of the service provider 1312. In other examples, the users 1314 can have gradated access to the services, which can be based on risk tolerance, IDV outputs, subscriptions, and so on. In at least one example, access to such services can be availed to the sellers 1316 via the POS application 1318. In additional or alternative examples, each service can be associated with its own access point (e.g., application, web browser, etc.).

The service provider 1312 can offer payment processing services for processing payments on behalf of the sellers 1316, as described above. For example, the service provider 1312 can provision payment processing software, payment processing hardware and/or payment processing services to sellers 1316, as described above, to enable the sellers 1316 to receive payments from the buyers 1320 when conducting POS transactions with the buyers 1320. For instance, the service provider 1312 can enable the sellers 1316 to receive cash payments, payment card payments, and/or electronic payments from buyers 1320 for POS transactions and the service provider 1312 can process transactions on behalf of the sellers 1316.

As the service provider 1312 processes transactions on behalf of the sellers 1316, the service provider 1312 can maintain accounts or balances for the sellers 1316 in one or more ledgers. For example, the service provider 1312 can analyze transaction data received for a transaction to determine an amount of funds owed to a seller 1316(A) for the transaction. In at least one example, such an amount can be a total purchase price less fees charged by the service provider 1312 for providing the payment processing services. Based on determining the amount of funds owed to the seller 1316(A), the service provider 1312 can deposit funds into an account of the seller 1316(A). The account can have a stored balance, which can be managed by the service provider 1312. The account can be different from a conventional bank account at least because the stored balance is managed by a ledger of the service provider 1312 and the associated funds are accessible via various withdrawal channels including, but not limited to, scheduled deposit, same-day deposit, instant deposit, and a linked payment instrument.

A scheduled deposit can occur when the service provider 1312 transfers funds associated with a stored balance of the seller 1316(A) to a bank account of the seller 1316(A) that is held at a bank or other financial institution (e.g., associated with the server computing device(s) 1310). Scheduled deposits can occur at a prearranged time after a POS transaction is funded, which can be a business day after the POS transaction occurred, or sooner or later. In some examples, the seller 1316(A) can access funds prior to a scheduled deposit. For instance, the seller 1316(A) may have access to same-day deposits (e.g., wherein the service provider 1312 deposits funds from the stored balance to a linked bank account of the seller on a same day as POS transaction, in some examples prior to the POS transaction being funded) or instant deposits (e.g., wherein the service provider 1312 deposits funds from the stored balance to a linked bank account of the seller on demand, such as responsive to a request). Further, in at least one example, the seller 1316(A) can have a payment instrument that is linked to the stored balance that enables the seller to access the funds without first transferring the funds from the account managed by the service provider 1312 to the bank account of the seller 1316(A).

In at least one example, the service provider 1312 may provide inventory management services. That is, the service provider 1312 may provide inventory tracking and reporting. Inventory management services may enable the seller 1316(A) to access and manage a database storing data associated with a quantity of each item that the seller 1316(A) has available (i.e., an inventory). Furthermore, in at least one example, the service provider 1312 can provide catalog management services to enable the seller 1316(A) to maintain a catalog, which can be a database storing data associated with items that the seller 1316(A) has available for acquisition (i.e., catalog management services). In at least one example, the catalog may include a plurality of data items and a data item of the plurality of data items may represent an item that the seller 1361(A) has available for acquisition. The service provider 1312 can offer recommendations related to pricing of the items, placement of items on the catalog, and multi-party fulfilment of the inventory.

In at least one example, the service provider 1312 can provide business banking services, which allow the seller 1316(A) to track deposits (from payment processing and/or other sources of funds) into an account of the seller 1316(A), payroll payments from the account (e.g., payments to employees of the seller 1316(A)), payments to other sellers (e.g., business-to-business) directly from the account or from a linked debit card, withdrawals made via scheduled deposit and/or instant deposit, etc. Furthermore, the business banking services can enable the seller 1316(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the sellers 1316 to visualize their cash flow to track their financial health, set aside money for upcoming obligations (e.g., savings), organize money around goals, etc.

In at least one example, the service provider 1312 can provide financing services and products, such as via business loans, consumer loans, fixed term loans, flexible term loans, and the like. In at least one example, the service provider 1312 can utilize one or more risk signals to determine whether to extend financing offers and/or terms associated with such financing offers.

In at least one example, the service provider 1312 can provide financing services for offering and/or lending a loan to a borrower that is to be used for, in some instances, financing the borrower's short-term operational needs (e.g., a capital loan). For instance, a potential borrower that is a seller can obtain a capital loan via a capital loan product in order to finance various operational costs (e.g., rent, payroll, inventory, etc.). In at least one example, the service provider 1312 can offer different types of capital loan products. For instance, in at least one example, the service provider 1312 can offer a daily repayment loan product, wherein a capital loan is repaid daily, for instance, from a portion of transactions processed by the payment processing service on behalf of the borrower. Additionally and/or alternatively, the service provider 1312 can offer a monthly repayment loan product, wherein a capital loan is repaid monthly, for instance, via a debit from a bank account linked to the payment processing service. The credit risk of the seller may be evaluated using risk models that take into account factors, such as payment volume, credit risk of similarly situated sellers, past transaction history, seasonality, credit history, and so on.

Additionally or alternatively, the service provider 1312 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a seller, which can be one of the sellers 1316. The service provider 1312 can generate the loan based at least in part on determining that the borrower purchased or intends to purchase the item from the seller. The loan can be associated with a balance based on an actual purchase price of the item and the borrower can repay the loan over time. In some examples, the borrower can repay the loan via installments, which can be paid via funds managed and/or maintained by the service provider 1312 (e.g., from payments owed to the seller from payments processed on behalf of the seller, funds transferred to the seller, etc.). The service provider 1312 can offer other specific financial products, such as payment instruments, tied specifically to the loan products. For example, in one implementation, the server provider 1312 associates capital to a seller or buyer's debit card, where the use of the debit card is defined by the terms of the loan. In some examples, the seller may only use the debit card for making specific purchases. In other examples, the "installment" associated with the loan product is credited directly via the payment instrument. The payment instrument is thus customized to the loan and/or the parties associated with the loan.

The service provider 1312 can provide web-development services, which enable users 1314 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the sellers 1316. In at least one example, the service provider 1312 can recommend and/or generate content items to supplement omni-channel presences of the sellers 1316. That is, if a seller of the sellers 1316 has a web page, the service provider 1312—via the web-development or other services—can recommend and/or generate additional content items to be presented via other channel(s), such as social media, email, etc.

Furthermore, the service provider 1312 can provide payroll services to enable employers to pay employees for work performed on behalf of employers. In at least one example, the service provider 1312 can receive data that includes time worked by an employee (e.g., through imported timecards and/or POS interactions), sales made by the employee, gratuities received by the employee, and so forth. Based on such data, the service provider 1312 can make payroll payments to employee(s) on behalf of an employer via the payroll service. For instance, the service provider 1312 can facilitate the transfer of a total amount to be paid out for the payroll of an employee from the bank of the employer to the bank of the service provider 1312 to be used to make payroll payments. In at least one example, when the funds have been received at the bank of the service provider 1312, the service provider 1312 can pay the employee, such as by check or direct deposit, often a day, a week, or more after when the work was actually performed by the employee. In additional or alternative examples, the service provider 1312 can enable employee(s) to receive payments via same-day or instant deposit based at least in part on risk and/or reliability analyses performed by the service provider 1312.

Moreover, in at least one example, the service provider 1312 can provide employee management services for managing schedules of employees. Further, the service provider 1312 can provide appointment services for enabling users 1314 to set schedules for scheduling appointments and/or users 1314 to schedule appointments.

In some examples, the service provider 1312 can provide restaurant management services to enable users 1314 to make and/or manage reservations, to monitor front-of-house and/or back-of-house operations, and so on. In such examples, the seller device(s) 1308 and/or server computing device(s) 1302 can be configured to communicate with one or more other computing devices, which can be located in the front-of-house (e.g., POS device(s)) and/or back-of-house (e.g., kitchen display system(s) (KDS)). In at least one example, the service provider 1312 can provide order management services and/or fulfillment services to enable restaurants to manage open tickets, split tickets, and so on and/or manage fulfillment services. In some examples, such services can be associated with restaurant sellers, as described above. In additional or alternative examples, such services can be any type of seller.

In at least one example, the service provider 1312 can provide fulfilment services, which can use couriers for delivery, wherein couriers can travel between multiple locations to provide delivery services, photography services, etc. Couriers can be users 1314 who can travel between locations to perform services for a requesting user 1314 (e.g., deliver items, capture images, etc.). In some examples, the courier can receive compensation from the service provider 1312. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1312 can receive requests for courier services, automatically assign the requests to active couriers, and communicate dispatch instructions to couriers via user interface (e.g., application, web browser, or other access point) presented via respective devices 1306.

In some examples, the service provider 1312 can provide omni-channel fulfillment services. For instance, if a buyer places an order with a seller and the seller cannot fulfill the order because one or more items are out of stock or otherwise unavailable, the service provider 1312 can leverage other sellers and/or sales channels that are part of the platform of the service provider 1312 to fulfill the buyer's order. That is, another seller can provide the one or more items to fulfill the order of the buyer. Furthermore, in some examples, another sales channel (e.g., online, brick-and-mortar, etc.) can be used to fulfill the order of the buyer.

In some examples, the service provider 1312 can enable conversational commerce via conversational commerce services, which can use one or more machine learning mechanisms to analyze messages exchanged between two or more users 1314, voice inputs into a virtual assistant or the like, to determine intents of user(s) 1314. In some examples, the service provider 1312 can utilize determined intents to automate buyer service, offer promotions, provide recommendations, or otherwise interact with buyers in real-time. In at least one example, the service provider 1312 can integrate products and services, and payment mechanisms into a communication platform (e.g., messaging, etc.) to enable buyers to make purchases, or otherwise transact, without having to call, email, or visit a web page or other channel of a seller. That is, conversational commerce alleviates the need for buyers to toggle back and forth between conversations and web pages to gather information and make purchases.

In at least one example, the service provider 1312 can provide a peer-to-peer payment service that enables peer-to-peer payments between two or more users 1314. In at least one example, the service provider 1312 can communicate with instances of a payment application (or other access point) installed on devices 1306 configured for operation by users 1314. In an example, an instance of the payment application executing on a first device operated by a payor can send a request to the service provider 1312 to transfer an amount of funds (e.g., fiat currency or non-fiat currency such as cryptocurrency, securities, and related assets) from an account of the payor to an account of a payee (e.g., a peer-to-peer payment). The service provider 1312 can facilitate the transfer and can send a notification to an instance of the payment application executing on a second mobile device operated by the payee that the transfer is in process (or has been completed). In some examples, the service provider 1312 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1312 funds the request to payee on behalf of the payor, to speed up the transfer process and compensate for any lags that may be attributed to payor's financial network.

In some implementations, the service provider 1312 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1306.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1312. For instance, the service provider 1312 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1306 (e.g., mobile device or conventional personal computer (PC)) based on instructions transmitted to and from the server computing device(s) 1302 (which, in such an example can be called a "messaging server"). In some instances, the messaging application can include a payment application with messaging capability that enables users of the payment application to communicate with one another. In such instances, the payment application can be executed on the user device 1306 based on instructions transmitted to and from the server computing device(s) 1302 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1312 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1314 may be new to the service provider 1312 such that the user 1314 that has not registered (e.g., subscribed to receive access to one or more services offered by the service provider) with the service provider 1312. The service provider 1312 can offer onboarding services for registering a potential user 1314 with the service provider 1312. In some examples, onboarding can involve presenting various questions, prompts, and the like to a potential user 1314 to obtain information that can be used to generate a profile for the potential user 1314. In at least one example, the service provider 1312 can provide limited or short-term access to its services prior to, or during, onboarding (e.g., a user of a peer-to-peer payment service can transfer and/or receive funds prior to being fully onboarded, a seller can process payments prior to being fully onboarded, etc.). In at least one example, responsive to the potential user 1314 providing all necessary information, the potential user 1314 can be onboarded to the service provider 1312. In such an example, any limited or short-term access to services of the service provider 1312 can be transitioned to more permissive (e.g., less limited) or longer-term access to such services.

The service provider 1312 can be associated with IDV services, which can be used by the service provider 1312 for compliance purposes and/or can be offered as a service, for instance to third-party service providers (e.g., associated with the server computing device(s) 1310). That is, the service provider 1312 can offer IDV services to verify the identity of users 1314 seeking to use or using their services. Identity verification requires a buyer (or potential buyer) to provide information that is used by compliance departments to prove that the information is associated with an identity of a real person or entity. In at least one example, the service provider 1312 can perform services for determining whether identifying information provided by a user 1314 accurately identifies the buyer (or potential buyer) (i.e., Is the buyer who they say they are?).

The service provider 1312 is capable of providing additional or alternative services and the services described above are offered as a sampling of services. In at least one example, the service provider 1312 can exchange data with the server computing device(s) 1310 associated with third-party service providers. Such third-party service providers can provide information that enables the service provider 1312 to provide services, such as those described above. In additional or alternative examples, such third-party service providers can access services of the service provider 1312. That is, in some examples, the third-party service providers can be subscribers, or otherwise access, services of the service provider 1312.

Techniques described herein can be configured to operate in both real-time/online and offline modes. "Online" modes refer to modes when devices are capable of communicating with the service provider 1312 (e.g., the server computing device(s) 1302) and/or the server computing device(s) 1310 via the network(s) 1304. In some examples, the seller device(s) 1308 are not capable of connecting with the service provider 1312 (e.g., the server computing device(s) 1302) and/or the server computing device(s) 1310, due to a network connectivity issue, for example. In additional or alternative examples, the server computing device(s) 1302 are not capable of communicating with the server computing device(s) 1310 due to network connectivity issue, for example. In such examples, devices may operate in "offline" mode where at least some payment data is stored (e.g., on the seller device(s) 1308) and/or the server computing device(s) 1302 until connectivity is restored and the payment data can be transmitted to the server computing device(s) 1302 and/or the server computing device(s) 1310 for processing.

In at least one example, the service provider 1312 can be associated with a hub, such as an order hub, an inventory hub, a fulfillment hub and so on, which can enable integration with one or more additional service providers (e.g., associated with the additional server computing device(s) 1310). In some examples, such additional service providers can offer additional or alternative services and the service provider 1312 can provide an interface or other computer-readable instructions to integrate functionality of the service provider 1312 into the one or more additional service providers.

Techniques described herein are directed to services provided via a distributed system of user devices 1306 that are in communication with one or more server computing devices 1302 of the service provider 1312. That is, techniques described herein are directed to a specific implementation—or, a practical application—of utilizing a distributed system of user devices 1306 that are in communication with one or more server computing devices 1302 of the service provider 1312 to perform a variety of services, as described above. The unconventional configuration of the distributed system described herein enables the server computing device(s) 1302 that are remotely-located from end-users (e.g., users 1314) to intelligently offer services based on aggregated data associated with the end-users, such as the users 1314 (e.g., data associated with multiple, different sellers and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct seller accounts, e.g., accounts within the control of the service provider 1312, and those outside of the control of the service provider 1312, to track the business standing (payables, receivables, payroll, invoices, appointments, capital, etc.) of the sellers. The techniques herein provide a consolidated view of a seller's cash flow, predict needs, preemptively offer recommendations or services, such as capital, coupons, etc., and/or enable money movement between disparate accounts (seller's, another seller's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1314 and user devices 1306. Furthermore, such features are changed dynamically based on the profiles of the users involved interacting with the GUIs. As such, techniques described herein are directed to improvements to computing systems.

Figure 14:
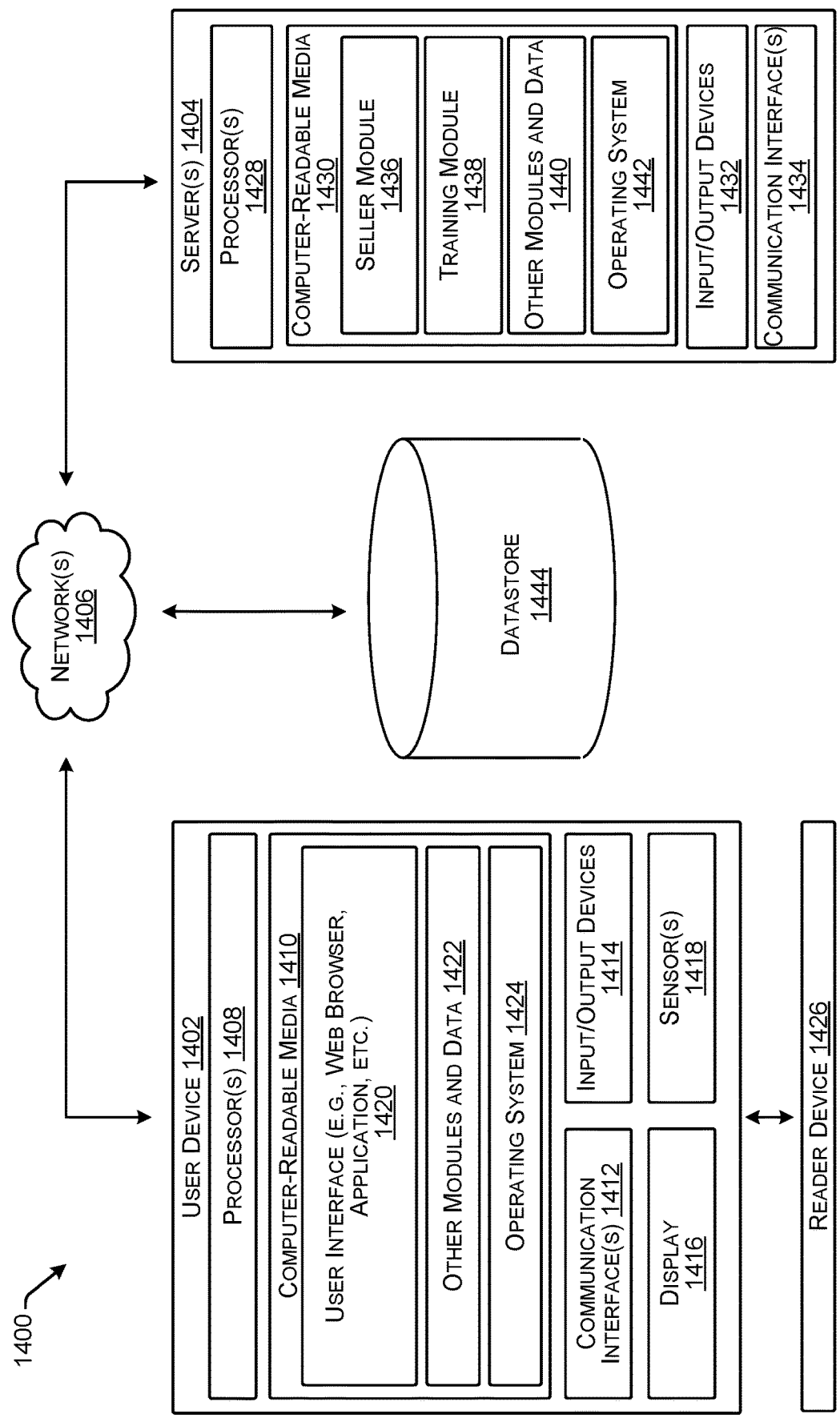
FIG. 14 illustrates additional details associated with individual components of the seller ecosystem described above in FIG. 13.

FIG. 14 depicts an illustrative block diagram illustrating a system 1400 for performing techniques described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 13.

As described above, the system 1400 can facilitate intelligently generating and/or managing invoices. In an example, the service provider can underwrite a buyer at a point-of-sale so that the service provider can determine whether the buyer can opt to tender payment for a cost of an entire purchase from a seller or individual items associated with the purchase via an invoice. In some examples, such underwriting can be additionally or alternatively based on information associated with the seller and/or the item(s). Furthermore, in some examples, the service provider can intelligently determine personalized or customized options for enabling the buyer to tender payment for the cost of the entire purchase or individual items associated with the purchase, for example, using other services provided by the service provider (e.g., a stored balance generated from funds received via a peer-to-peer payment service availed by the service provider, a loan offered by the service provider, etc.). In at least one example, techniques described herein can facilitate the management of invoices, for example, by enabling sellers to track payment (or lack thereof) of invoices. In some examples, the service provider can offer a seller the ability to incentivize payment for an invoice based on changed circumstances of the seller (e.g., reduced cash flow, unforeseen bill payment, etc.) and/or information associated with the invoice. In some examples, such an incentive can modify terms of the invoice (e.g., reduce the total cost) and/or offer a discount for a future transaction (e.g., with the seller or another seller associated with the service provider).

In at least one example, the service provider can offer payment processing services whereby the service provider processes transactions for sellers associated with the service provider. The service provider can additionally provide other services including, but not limited to, inventory management services, catalog management services, business banking services, financing services, lending services, reservation management services, estimating services, invoice services, web-development services, payroll services, employee management services, appointment services, loyalty tracking services, restaurant management services, order management services, fulfillment services, peer-to-peer payment services, onboarding services, identity verification (IDV) services, and so on. Additional details associated with such services are described below. In some examples, the service provider can track which services are used by individual buyers and/or sellers. In at least one example, the service provider can leverage information associated with buyers and/or sellers that utilize the services availed by the service provider to intelligently underwrite transactions to determine terms associated with invoices for such transactions, as described herein. For example, service usage by buyers and/or sellers can inform tender options as described herein. Furthermore, in some examples, service usage can inform incentives used for incentivizing payment for invoices as described herein.

Aspects of the system 1400 are described above with reference to FIG. 1. For example, the seller computing device(s) 110 and/or the buyer computing device(s) 106 can correspond to the user device 1402. The server computing device(s) 118 can correspond to the server(s) 1404. The network(s) 1406 can correspond to the network(s) 120.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices 1414, a display 1416, and sensor(s) 1418.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, modules or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, or the like. In other examples, the user interface 1420 can be presented via an application, such as a mobile application or desktop application, which can be provided by a service provider 1312 associated with the server(s) 1404, or which can be an otherwise dedicated application. In some examples, the user interface 1420 can be the buyer user interface 108, the payment processing user interface 112, the invoice user interface 114, etc. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, to determine context or intent of the user, which may be treated in a manner similar to "direct" user input.

Depending on the type of the user device 1402, the computer-readable media 1410 can also optionally include other functional components and data, such as other modules and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtually reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1312, described above, to provide one or more services. That is, in some examples, the service provider 1312 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1314 and/or for sending users 1314 notifications regarding available appointments with seller(s) located proximate to the users 1314. In at least one example, location can be used for taking payments from nearby buyers when they leave a geofence, or location can be used to initiate an action responsive to users 1314 enter a brick-and-mortar store of a seller. Location can be used in additional or alternative ways as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe (i.e., a card-present transaction where a buyer slides a card having a magnetic strip through a payment reader that captures payment data contained in the magnetic strip), a dip (i.e., a card-present transaction where a buyer inserts a card having an embedded microchip (i.e., chip) into a payment reader first until the payment reader prompts the buyer to remove the card), or a tap (i.e., a card-present transaction where a buyer may tap or hover his or her electronic device such as a smart phone running a payment application over a payment reader to complete a transaction via short-range communication) to obtain payment data associated with a buyer. Additionally or optionally, the reader device 1426 may also include a biometric sensor to receive and process biometric characteristics and process them as payment instruments, given that such biometric characteristics are registered with the payment service system and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more modules and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one module for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 146, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the buyer, an address of the buyer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the buyer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single seller or enterprise, or can be provided by the servers and/or services of multiple different buyers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units, and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program modules, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider 1312 and/or payment processing service. Functional components stored in the computer-readable media 1430 can optionally include a seller module 1436, a training module 1438, and one or more other modules and data 1440.

The seller module 1436 can be configured to receive transaction data from POS systems, such as the POS system 1324 described above with reference to FIG. 13. The seller module 1436 can transmit requests (e.g., authorization, capture, settlement, etc.) to payment service server computing device(s) to facilitate POS transactions between sellers and buyers. The seller module 1436 can communicate the successes or failures of the POS transactions to the POS systems. The seller module 122 described above with respect to FIG. 1 can correspond to the seller module 1436.

The training module 1438 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1402 and/or the server(s) 1404 for use at a time after the data models have been trained (e.g., at runtime).

The one or more other modules and data 1440 can include the invoice module 124, the functionality of which is described, at least partially, above. Further, the one or more other modules and data 1440 can include programs, drivers, etc., and the data used or generated by the functional components. Further, the server(s) 1404 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406.

In at least one example, the datastore 1444 can store user profiles, which can include seller profiles, buyer profiles, and so on.

Seller profiles can store, or otherwise be associated with, data associated with sellers. For instance, a seller profile can store, or otherwise be associated with, information about a seller (e.g., name of the seller, geographic location of the seller, operating hours of the seller, employee information, etc.), a seller category classification (MCC), item(s) offered for sale by the seller, hardware (e.g., device type) used by the seller, transaction data associated with the seller (e.g., transactions conducted by the seller, payment data associated with the transactions, items associated with the transactions, descriptions of items associated with the transactions, itemized and/or total spends of each of the transactions, parties to the transactions, dates, times, and/or locations associated with the transactions, etc.), loan information associated with the seller (e.g., previous loans made to the seller, previous defaults on said loans, etc.), risk information associated with the seller (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, buyer service data, etc. The seller profile can securely store bank account information as provided by the seller. Further, the seller profile can store payment information associated with a payment instrument linked to a stored balance of the seller, such as a stored balance maintained in a ledger by the service provider 1312.

Buyer profiles can store, or otherwise be associated with, data associated with seller. For instance, such buyer data can include, but is not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, buyer service data, etc.

Furthermore, in at least one example, the datastore 1444 can store inventory database(s) and/or catalog database(s). As described above, an inventory can store data associated with a quantity of each item that a seller has available to the seller. Furthermore, a catalog can store data associated with items that a seller has available for acquisition. The datastore 1444 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 1, 13, and 14 for convenience and ease of understanding. However, the methods illustrated are not limited to being performed using components described in FIGS. 1, 13, and 14, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

We claim:

1. A system comprising:
   one or more processors; and
   one or more computer-readable media storing instructions that, when executed by the one or more processors, cause the system to perform operations comprising:
   storing, in a datastore associated a service provider, buyer profiles associated with a plurality of buyers and seller profiles of a plurality of sellers, wherein individual profiles of the buyer profiles and the seller profiles include historical interaction data corresponding to one or more interactions of the respective buyers and sellers with one or more services of a plurality of services offered by the service provider, and wherein the historical interaction data includes historical transaction data corresponding to one or more historical transactions of the respective buyers and sellers;
   training, by one or more server computing devices of the service provider and using training data and a machine learning mechanism, a machine learning model configured to output a plurality of available tender options for a particular transaction, wherein the training data includes at least a portion of the historical interaction data;
   receiving, by the one or more server computing devices of the service provider and from a seller computing device operable by a seller of the plurality of sellers, first transaction data associated with a transaction between the seller and a buyer of the plurality of buyers, the first transaction data including at least one item selected for purchase by the buyer, a cost associated with the at least one item, and an indication of a seller profile associated with the seller;
   generating, by the one or more server computing devices, in near real time, a graphical user interface (GUI) comprising information associated with the at least one item and the cost associated with the at least one item;
   causing presentation, by the one or more server computing devices, of the GUI on the seller computing device or on a buyer computing device operable by the buyer;
   receiving, by the one or more server computing devices of the service provider and from the seller computing device, second transaction data, the second transaction data including an indication of a buyer profile associated with the buyer;
   responsive at least in part to receiving the second transaction data and based at least in part on the second transaction data, determining, by the one or more server computing devices and by leveraging machine learning algorithms combined with the second transaction data, a plurality of tender options personalized to the buyer for tendering payment to the seller for at least a portion of a transaction amount, wherein the plurality of tender options are based at least in part on (i) the machine learning model, (ii) one or more of the buyer profile, the seller profile, or the first transaction data, and (iii) one or more services of the service provider available to the buyer based at least in part on the buyer profile;
   reconfiguring, by the one or more server computing devices, in near real time, the GUI to include a plurality of actuation mechanisms associated with respective tender options of the plurality of tender options; and
   causing presentation, by the one or more server computing devices, of the reconfigured GUI on the seller computing device or on the buyer computing device operable by the buyer.

2. The system of claim 1, the operations further comprising:
   receiving, by the one or more server computing devices, an indication of actuation of at least one actuation mechanism of the plurality of actuation mechanisms; and
   based at least in part on receiving the indication of actuation, initiating, by the one or more server computing devices, a payment flow for the transaction.

3. The system of claim 2, wherein the second transaction data includes an identifier associated with the buyer, and the payment flow comprises:
   accessing, by the one or more server computing devices and based at least in part on the identifier, payment data associated with the buyer; and
   processing, by the one or more server computing devices, payment for the at least the portion of the transaction amount based at least in part on the payment data.

4. The system of claim 2, wherein the reconfigured GUI comprises a digital invoice based at least in part on an invoice template associated with the seller, wherein the digital invoice enables the buyer to tender payment for the transaction over a network at a time after the transaction.

5. The system of claim 1, wherein the reconfigured GUI is presented on the buyer computing device after the buyer has left a point of sale.

6. The system of claim 2, wherein the plurality of services offered by the service provider comprise at least one of a peer-to-peer payment service or a lending service.

7. The system of claim 1, wherein the plurality of tender options comprises one or more of financing available from the service provider, access to an account of the buyer that is managed by the service provider, or invoicing the buyer.

8. The system of claim 1, wherein a tender option one of the plurality of tender options comprises financing available from the service provider, and wherein a financing amount associated with the financing may be repaid in installment payments.

9. The system of claim 1, the operations further comprising:
   determining, by the one or more server computing devices, a change in at least one of (i) the one or more services available to the buyer, (ii) the buyer profile, or (iii) the seller profile; and
   based at least in part on the change, causing an update, by the one or more server computing devices, of the GUI with a different plurality of tender options.

10. The system of claim 1, wherein the portion of the transaction corresponds to an item of a plurality of items associated with the transaction.

11. The system of claim 1, wherein the transaction comprises a future transaction and the GUI is reconfigured based on an estimated payment amount associated with the future transaction.

12. A method comprising:
   storing, in a datastore associated a service provider, buyer profiles associated with a plurality of buyers and seller profiles of a plurality of sellers, wherein individual profiles of the buyer profiles and the seller profiles include historical interaction data corresponding to one or more interactions of the respective buyers and sellers with one or more services of a plurality of services offered by the service provider, and wherein the historical interaction data includes historical transaction data corresponding to one or more historical transactions of the respective buyers and sellers;
   training, by one or more server computing devices of the service provider and using training data and a machine learning mechanism, a machine learning model configured to output a plurality of available tender options for a particular transaction, wherein the training data includes at least a portion of the historical interaction data;
   receiving, by the one or more server computing devices of the service provider and from a seller computing device operable by a seller of the plurality of sellers, first transaction data associated with a transaction between the seller and a buyer of the plurality of buyers the first transaction data including at least one item selected for purchase by the buyer, a cost associated with the at least one item, and an indication of a seller profile associated with the seller;
   generating, by the one or more server computing devices, in near real time, a graphical user interface (GUI) comprising information associated with the at least one item and the cost associated with the at least one item;
   causing presentation, by the one or more server computing devices, of the GUI on the seller computing device or on a buyer computing device operable by the buyer;
   receiving, by the one or more server computing devices of the service provider and from the seller computing device, second transaction data, the second transaction data including an indication of a buyer profile associated with the buyer;
   responsive at least in part to receiving the second transaction data and based at least in part on the second transaction data, determining, by the one or more server computing devices and by leveraging machine learning algorithms combined with the second transaction data, a plurality of tender options personalized to the buyer for tendering payment to the seller for at least a portion of a transaction amount, wherein the plurality of tender options are based at least in part on (i) the machine learning model, (ii) one or more of the buyer profile, the seller profile, or the first transaction data, and (iii) one or more services of the service provider available to the buyer based at least in part on the buyer profile;
   reconfiguring, by the one or more server computing devices, in near real time, the GUI to include a plurality of actuation mechanisms associated with respective tender options of the plurality of tender options; and
   causing presentation, by the one or more server computing devices, of the reconfigured GUI on the seller computing device or on the buyer computing device operable by the buyer.

13. The method of claim 12, further comprising:
   receiving, by the one or more server computing devices, an indication of actuation of at least one actuation mechanism of the plurality of actuation mechanisms; and
   based at least in part on receiving the indication of actuation, initiating, by the one or more server computing devices, a payment flow for the transaction.

14. The method of claim 13, wherein the second transaction data includes an identifier associated with the buyer, and the payment flow comprises:
   accessing, by the one or more server computing devices and based at least in part on the identifier, payment data associated with the buyer; and
   processing, by the one or more server computing devices, payment for the at least the portion of the transaction amount based at least in part on the payment data.

15. The method of claim 12, wherein the plurality of services offered by the service provider comprise at least one of a peer-to-peer payment service or a lending service.

16. The method of claim 12, wherein the plurality of tender options comprises one or more of financing available from the service provider, access to an account of the buyer that is managed by the service provider, or invoicing the buyer.

17. The method of claim 12, wherein a tender option one of the plurality of tender options comprises financing available from the service provider, and wherein a financing amount associated with the financing may be repaid in installment payments.

18. One or more non-transitory computer-readable media storing instructions executable by one or more processors that, when executed by the one or more processors, cause the one or more processors to perform acts comprising:
   storing, in a datastore associated a service provider, buyer profiles associated with a plurality of buyers and seller profiles of a plurality of sellers, wherein individual profiles of the buyer profiles and the seller profiles include historical interaction data corresponding to one or more interactions of the respective buyers and sellers with one or more services of a plurality of services offered by the service provider, and wherein the historical interaction data includes historical transaction data corresponding to one or more historical transactions of the respective buyers and sellers;
   training, by one or more server computing devices of the service provider and using training data and a machine learning mechanism, a machine learning model configured to output a plurality of available tender options for a particular transaction, wherein the training data includes at least a portion of the historical interaction data;
   receiving, by the one or more server computing devices of the service provider and from a seller computing device operable by a seller of the plurality of sellers, first transaction data associated with a transaction between the seller and a buyer of the plurality of buyers, the first transaction data including at least one item selected for purchase by the buyer, a cost associated with the at least one item, and an indication of a seller profile associated with the seller;
   generating, by the one or more server computing devices, in near real time, a graphical user interface (GUI) comprising information associated with the at least one item and the cost associated with the at least one item;
   causing presentation, by the one or more server computing devices, of the GUI on the seller computing device or on a buyer computing device operable by the buyer;
   receiving, by the one or more server computing devices of the service provider and from the seller computing device, second transaction data, the second transaction data including an indication of a buyer profile associated with the buyer;
   responsive at least in part to receiving the second transaction data and based at least in part on the second transaction data, determining, by the one or more server computing devices and by leveraging machine learning algorithms combined with the second transaction data, a plurality of tender options personalized to the buyer for tendering payment to the seller for at least a portion of a transaction amount, wherein the plurality of tender options are based at least in part on (i) the machine learning model, (ii) one or more of the buyer profile, the seller profile, or the first transaction data, and (iii) one or more services of the service provider available to the buyer based at least in part on the buyer profile;
   reconfiguring, by the one or more server computing devices, in near real time, the GUI to include a plurality of actuation mechanisms associated with respective tender options of the plurality of tender options; and
   causing presentation, by the one or more server computing devices, of the reconfigured GUI on the seller computing device or on the buyer computing device operable by the buyer.

19. The one or more non-transitory computer-readable media of claim 18, wherein the reconfigured GUI comprises a digital invoice based at least in part on an invoice template associated with the seller, wherein the digital invoice enables the buyer to tender payment for the transaction over a network at a time after the transaction.

20. The one or more non-transitory computer-readable media of claim 18, wherein the reconfigured GUI is presented on the buyer computing device after the buyer has left a point of sale.

* * * * *